United States Patent
Buxton et al.

(10) Patent No.: US 10,357,715 B2
(45) Date of Patent: Jul. 23, 2019

(54) RACING SIMULATION

(71) Applicant: BUXTON GLOBAL ENTERPRISES, INC., Charleston, IL (US)

(72) Inventors: E. Dale Buxton, San Diego, CA (US); Alejandro Agag, London (GB)

(73) Assignee: BUXTON GLOBAL ENTERPRISES, INC., Charleston, IL (US)

(*) Notice: Subject to any disclaimer, the term of this patent is extended or adjusted under 35 U.S.C. 154(b) by 39 days.

(21) Appl. No.: 15/813,662

(22) Filed: Nov. 15, 2017

(65) Prior Publication Data

US 2019/0009175 A1 Jan. 10, 2019

Related U.S. Application Data

(60) Provisional application No. 62/530,037, filed on Jul. 7, 2017.

(51) Int. Cl.
*A63F 13/00* (2014.01)
*A63F 9/24* (2006.01)
(Continued)

(52) U.S. Cl.
CPC .......... *A63F 13/525* (2014.09); *A63F 13/213* (2014.09); *A63F 13/26* (2014.09);
(Continued)

(58) Field of Classification Search
CPC ........ A63F 13/213; A63F 13/26; A63F 13/28; A63F 13/525; A63F 13/56; A63F 13/57;
(Continued)

(56) References Cited

U.S. PATENT DOCUMENTS 5,921,780 A * 7/1999 Myers ............... G09B 9/05
434/29
6,020,851 A * 2/2000 Busack .............. G01S 5/0027
340/323 R
(Continued)

FOREIGN PATENT DOCUMENTS

EP 1 198 274 5/2005
EP 2 291 826 3/2011
(Continued)

OTHER PUBLICATIONS

Bradford City Hall Leica Geosystems 3D Laser Scan using ScanStation C10. Retrieved on https://www.youtube.com/watch?v=Dl2-XQFy6Pl&list=UU8rkJcmeC9RsSQ0L05KSM3g. Retrieved Feb. 10, 2018, 39 pages.
(Continued)

*Primary Examiner* — Milap Shah
(74) *Attorney, Agent, or Firm* — Morrison & Foerster LLP

(57) ABSTRACT

A method for displaying a virtual vehicle includes identifying a position of a physical vehicle at a racecourse, identifying a position of a point of view at the racecourse, providing a portion of the virtual vehicle visible from a virtual position of the point of view. The method operates by calculating the virtual position within a virtual world based on the position of the point of view. A system for displaying virtual vehicles includes a first sensor detecting a position of a physical vehicle at a racecourse, a second sensor detecting a position of a point of view at the racecourse, and a simulation system providing a portion of the virtual vehicle visible from a virtual position of the point of view. The simulation system is configured to calculate the virtual position of the point of view within a virtual world based on the position of the point of view.

20 Claims, 11 Drawing Sheets

(51) Int. Cl.

| | |
|---|---|
| A63F 13/525 | (2014.01) |
| G06T 15/20 | (2011.01) |
| G06F 3/01 | (2006.01) |
| A63F 13/803 | (2014.01) |
| A63F 13/213 | (2014.01) |
| G06T 19/00 | (2011.01) |
| G09B 9/04 | (2006.01) |
| G09B 9/05 | (2006.01) |
| A63F 13/26 | (2014.01) |
| A63F 13/65 | (2014.01) |
| A63F 13/5255 | (2014.01) |
| A63F 13/28 | (2014.01) |
| H04Q 9/00 | (2006.01) |
| G06T 15/60 | (2006.01) |

(52) U.S. Cl.
CPC .......... *A63F 13/28* (2014.09); *A63F 13/5255* (2014.09); *A63F 13/65* (2014.09); *A63F 13/803* (2014.09); *G06F 3/013* (2013.01); *G06T 15/205* (2013.01); *G06T 19/006* (2013.01); *G09B 9/04* (2013.01); *G09B 9/05* (2013.01); *G06F 3/012* (2013.01); *G06T 15/60* (2013.01); *G06T 2215/16* (2013.01); *H04Q 9/00* (2013.01)

(58) Field of Classification Search
CPC ........ A63F 13/577; A63F 13/58; A63F 13/65; A63F 13/803; G06F 3/013; G06T 15/205; G06T 15/60; G06T 19/006; G06T 2215/16; G09B 9/04; G09B 9/05; H04Q 9/00; G01C 21/3647
See application file for complete search history.

(56) References Cited

U.S. PATENT DOCUMENTS

| | | | |
|---|---|---|---|
| 6,080,063 A | 6/2000 | Khosla | |
| 7,265,663 B2 | 9/2007 | Steele | |
| 7,446,772 B2 | 11/2008 | Wong et al. | |
| 7,785,178 B2* | 8/2010 | Tipping | A63F 13/10 463/6 |
| 8,092,287 B2* | 1/2012 | Purvis | A63K 1/00 463/1 |
| 8,160,994 B2 | 4/2012 | Ong et al. | |
| 8,585,476 B2 | 11/2013 | Mullen | |
| 8,882,560 B2 | 11/2014 | Sofman et al. | |
| 9,233,309 B2* | 1/2016 | Gallizzi | A63F 13/355 |
| 9,251,603 B1* | 2/2016 | Kozko | G06T 11/00 |
| 9,352,216 B2 | 5/2016 | Mullen | |
| 9,597,567 B1 | 3/2017 | Tran et al. | |
| 9,610,476 B1 | 4/2017 | Tran et al. | |
| 2001/0003715 A1* | 6/2001 | Jutzi | A63F 13/12 463/40 |
| 2002/0191004 A1 | 12/2002 | Ebersole et al. | |
| 2004/0121829 A1* | 6/2004 | Reed | A63F 13/10 463/6 |
| 2004/0135677 A1* | 7/2004 | Asam | A63F 13/12 340/425.5 |
| 2004/0224740 A1 | 11/2004 | Ball et al. | |
| 2005/0096110 A1* | 5/2005 | Ohyagi | A63F 13/10 463/6 |
| 2005/0148388 A1 | 7/2005 | Vayra et al. | |
| 2006/0223637 A1 | 10/2006 | Rosenberg | |
| 2007/0156327 A1* | 7/2007 | Tipping | A63F 13/10 463/7 |
| 2008/0026838 A1 | 1/2008 | Dunstan et al. | |
| 2008/0096623 A1* | 4/2008 | Fujii | A63F 13/10 463/6 |
| 2008/0266324 A1* | 10/2008 | Lynch | G01C 21/20 345/634 |
| 2009/0076784 A1 | 3/2009 | Ong et al. | |
| 2010/0271367 A1* | 10/2010 | Vaden | G06T 19/006 345/420 |
| 2010/0305724 A1 | 12/2010 | Fry et al. | |
| 2012/0100911 A1 | 4/2012 | Rejen | |
| 2012/0206452 A1 | 8/2012 | Geisner et al. | |
| 2012/0259603 A1 | 10/2012 | Ong | |
| 2012/0269494 A1 | 10/2012 | Satyanarayana et al. | |
| 2013/0083061 A1 | 4/2013 | Mishra | |
| 2014/0146152 A1* | 5/2014 | Frashure | G03B 15/00 348/77 |
| 2014/0274242 A1* | 9/2014 | Haswell | A63F 13/10 463/7 |
| 2014/0278847 A1 | 9/2014 | Gallo | |

FOREIGN PATENT DOCUMENTS

| | | |
|---|---|---|
| EP | 2 326 397 | 6/2011 |
| WO | WO-96/31831 | 10/1996 |
| WO | WO-2001/05476 | 1/2001 |
| WO | WO-2002/09833 | 2/2002 |
| WO | WO-2009/127927 | 10/2009 |
| WO | WO-2010/035106 | 4/2010 |
| WO | WO-2013/024364 | 2/2013 |
| WO | WO-2014/140915 | 9/2014 |

OTHER PUBLICATIONS

Castrol Russia, "Castrol Virtual Racers," Retrieved on https://www.youtube.com/watch?v=eLFAJY6IzTw. Retrieved on Feb. 10, 2018, 384 pages.
BBC News, "Video gamers to play for 'real'," Retrieved on Feb. 11, 2018. Retrieved on http://news.bbc.co.uk/2/hi/programmes/click_online/8333340.stm.
Chapter II Demand and the Response to the Written Opinion of the International Searching Authority for PCT/US2018/041082, dated May 7, 2019, 15 pages.
Demo 07: Total Immersion, D'Fusion, Feb. 20, 2007, from YouTube, URL:https://www.youtube.com/watch?v=6NKT6eUGJDE, retrieved from the Internet on Oct. 11, 2018, 3 pages.
International Search Report and Written Opinion for PCT/US2018/041082, dated Oct. 25, 2018, 14 pages.
SensoMotoric Instruments: "Eye Tracking HMD based on HTC Vive", Aug. 18, 2016, URL:www.nbtltd.com/download-document/518-htc-vive, retrieved from the Internet on Oct. 17, 2018, 4 pages.

* cited by examiner

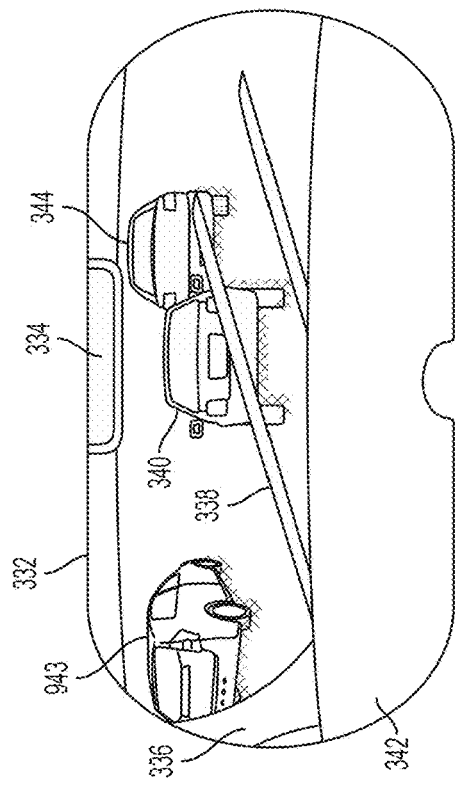
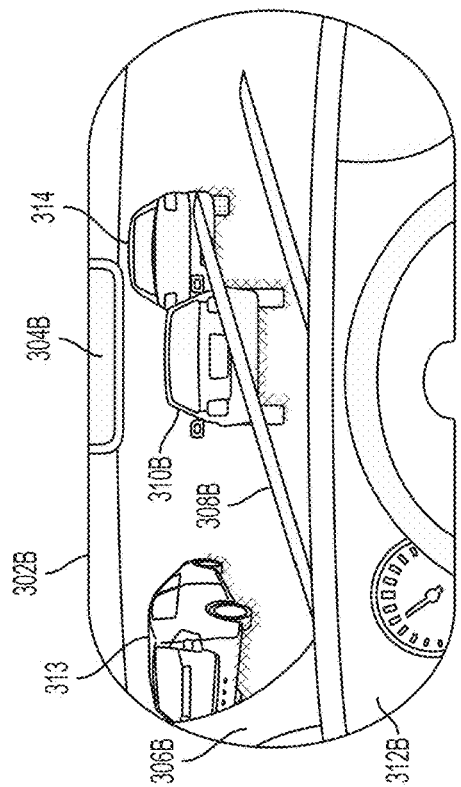
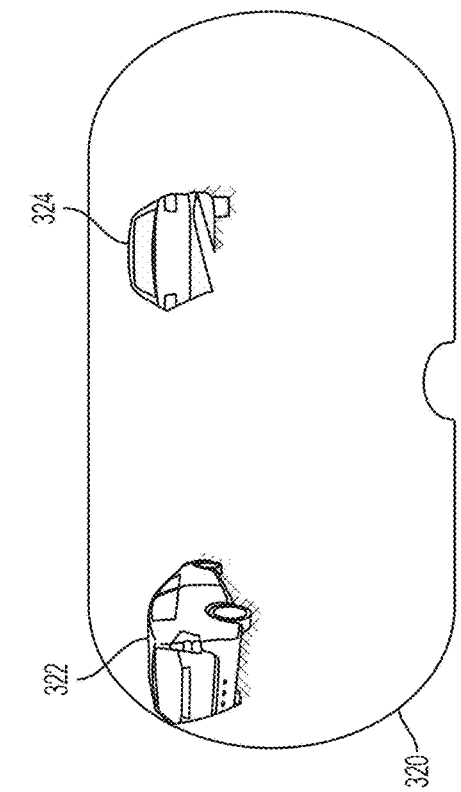

RACING SIMULATION

CROSS-REFERENCE TO RELATED APPLICATIONS

This application claims the benefit of U.S. Provisional Application No. 62/530,037, filed on Jul. 7, 2017, entitled "Racing Simulation," which is herein incorporated by reference in its entirety.

FIELD

The present disclosure relates generally to vehicle simulation, and more specifically to combining real world and virtual world automobile racing.

BACKGROUND

For almost every automobile, there is a racing competition. Our media is full of car races, bike races, and truck races on racecourses. Each race produces a champion and, racing series produce season champions.

Automobile racing is not limited to the real world. Recently, virtual automobile racing has gained popularity. Virtual racing champions can win hundreds of thousands of dollars per race. Season virtual champions can win millions of dollars.

SUMMARY

In some embodiments, a method for displaying a virtual vehicle includes identifying a position of a physical vehicle at a racecourse, identifying a position of a point of view at the racecourse, and providing, to a display system, a portion of the virtual vehicle visible from a virtual position of the point of view calculated within a virtual world based on the position of the point of view at the racecourse. As an exemplary advantage, embodiments described herein may allow a physical vehicle operator to compete with a virtual vehicle operator. Further, by displaying a representation of the portion of the virtual vehicle visible from the virtual position of the point of view, the competition between the physical and virtual vehicle operators may appear more realistic.

In some embodiments, the portion of the virtual vehicle visible from the virtual position of the point of view includes a portion of the virtual vehicle that is unobscured, from the virtual position of the point of view, by a representation of the physical vehicle at a virtual position of the physical vehicle in the virtual world.

In some embodiments, the method further includes simulating, by the simulation system, an interaction between the virtual vehicle and the representation of the physical vehicle in the virtual world, wherein the portion of the virtual vehicle visible from the virtual position of the point of view is calculated based on the interaction.

In some embodiments, the position of the point of view at the racecourse includes a point of view of an operator of the physical vehicle, and identifying a position of a point of view at the racecourse includes detecting, at a sensor, the point of view of the operator of the physical vehicle, the method further including: identifying a position of a physical object; receiving kinematics information of the virtual vehicle; generating, at a display system, a representation of the virtual vehicle based on the position of the physical object, the position of the point of view at the racecourse, and the kinematics information; and displaying the representation of the virtual vehicle such that the virtual vehicle is aligned with the physical object from the perspective of the position of the point of view at the racecourse.

In some embodiments, the method further includes generating, at a display system, the representation of the portion of the virtual vehicle visible from the virtual position of the point of view.

In some embodiments, the method further includes displaying, by the display system, a series of representations of the virtual vehicle over a period of time to simulate a trajectory of the virtual vehicle on the racecourse, the series of representations includes the representation of the portion of the virtual vehicle visible form the virtual position of the point of view. In some embodiments, a predicted trajectory of the virtual vehicle is displayed. The prediction may be based on current trajectory, acceleration, current vehicle parameters, etc. This may allow an audience member to anticipate if a virtual vehicle is likely to overtake a physical vehicle. The predicted trajectory may be presented as a line, such as a yellow line. Other displays may also be included, such as "GOING TO PASS!" or "GOING TO CRASH!"

In some embodiments, the method further includes storing, by the display system, a digital 3-D model of the virtual vehicle used to generate each representation from the series of representations, each representation is generated by the display system based on the digital 3-D model.

In some embodiments, the method further includes receiving a digital 3-D model of the virtual vehicle used to generate each representation from the series of representations, each representation is generated by the display system based on the digital 3-D model.

In some embodiments, the kinematics information includes one or more vectors of motion, one or more scalars of motion, a position vector, a GPS location, a velocity, an acceleration, an orientation, or a combination thereof of the virtual vehicle.

In some embodiments, identifying the position of the physical vehicle includes detecting one or more vectors of motion, one or more scalars of motion, a position vector, a GPS location, a velocity, an acceleration, an orientation, or a combination thereof of the virtual vehicle.

In some embodiments, identifying the position of the point of view at the racecourse includes detecting a spatial position of a head of an operator of the physical vehicle.

In some embodiments, the method further includes transmitting, by a telemetry system coupled to the physical vehicle, the spatial position to a simulator system; receiving, at the telemetry system, information related to the portion of the virtual vehicle visible from the virtual position of the point of view; and displaying, to the operator of the physical vehicle, the representation of the portion of the virtual vehicle based on the information.

In some embodiments, the method further includes displaying the representation of the portion of the virtual vehicle includes: translating the information into a set of graphical elements, displaying the representation of the portion includes displaying the set of graphical elements. In some embodiments, the method further includes computing, at the simulation system, the information related to the portion visible from the virtual position of the point of view.

In some embodiments, displaying the series of representations of the virtual vehicle includes displaying the series of representation on a display of the physical vehicle, and the display is a transparent organic light-emitting diode (T-OLED) display that allows light to pass through the T-OLED to display the field of view to the operator.

In some embodiments, displaying the series of representations of the virtual vehicle includes displaying the series of representations on a display of the physical vehicle, and the display is an LCD display, the method further including: capturing, by a camera coupled to the physical vehicle, an image representing the field of view of the physical world as seen by the operator on the display in the physical vehicle; and outputting the image on a side of the LCD display to display the field of view to the operator, the series of representations are overlaid on the image displayed by the LCD display.

In some embodiments, displaying the series of representations of the virtual vehicle includes displaying the series of representations on a display of the physical vehicle, and the display includes a front windshield of the physical vehicle, one or more side windows of the physical vehicle, a rear windshield of the physical vehicle, one or more side mirrors, a rearview mirror, or a combination thereof.

In some embodiments, displaying the series of representations of the virtual vehicle includes displaying the series of representations on a display of a headset worn by the operator. In some embodiments, the headset is a helmet.

In some embodiments, identifying the position of the point of view at the racecourse includes detecting one or more of a spatial position of a user's eyes, a gaze direction of the user's eyes, or a focus point of the user's eyes.

In some embodiments, the method further includes: providing the position of the physical vehicle and the position of the point of view at the racecourse to a simulation system; calculating, by the simulation system, a virtual world including the virtual vehicle and a representation of the physical vehicle; calculating, by the simulation system, a virtual position of the point of view within the virtual world based on the position of the point of view at the racecourse; and calculating, by the simulation system, the portion of the virtual vehicle visible from the virtual position of the point of view, and providing, to a display system, the portion of the virtual vehicle visible from the virtual position of the point of view includes outputting, by the simulation system, the portion of the virtual vehicle visible from the virtual position of the point of view.

In some embodiments, identifying the position of the physical vehicle includes receiving a location of each of two portions of the vehicle.

In some embodiments, identifying the position of the physical vehicle includes receiving a location of one portion of the vehicle and an orientation of the vehicle. In some embodiments, receiving the orientation of the vehicle includes receiving gyroscope data.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse.

In some embodiments, the position of the point of view at the racecourse includes a position of a camera present at a racecourse and imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, identifying the position of the point of view at the racecourse includes at least one of measuring a point of gaze of eyes, tracking eye movement, tracking head position, identifying a vector from one or both eyes to a fixed point on the physical vehicle, identifying a vector from a point on the head to a fixed point on the physical vehicle, identifying a vector from a point on eye-wear to a fixed point on the physical vehicle, identifying a vector from a point on a head gear to a fixed point on the physical vehicle, identifying a vector from one or both eyes to a fixed point in a venue, identifying a vector from a point on the head to a fixed point in the venue, identifying a vector from a point on eye-wear to a fixed point in the venue, or identifying a vector from a point on a head gear to a fixed point in the venue. In some embodiments, identifying the position of the point of view at the racecourse includes measuring the point of gaze of the eyes and the measuring includes measuring light reflection or refraction from the eyes.

In some embodiments, providing the position of the physical vehicle and the position of the point of view at the racecourse includes wireless transmitting at least one position.

In some embodiments, calculating a virtual world includes transforming physical coordinates of the physical vehicle to coordinates in the virtual world and the virtual position of the physical vehicle includes the virtual coordinates.

In some embodiments, calculating the portion of the virtual vehicle visible from the virtual position of the point of view includes: calculating a representation of the physical vehicle in the virtual world, calculating a representation of a physical object in the virtual world between the point of view and the virtual vehicle within the virtual world, and extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion.

In some embodiments, extracting the portions of the virtual vehicle may include determining which pixels are obstructed by other representations, and only displaying pixels that are not obstructed by other representations. In some embodiments, extracting the portions of the virtual vehicle may include setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, calculating the representation of the physical object between the virtual position of the point of view and the representation of the physical vehicle includes accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the virtual position of the point of view includes a virtual reflection. In some embodiments, the virtual reflection is at least one of a reflection of the virtual vehicle and a reflection on the virtual vehicle.

In some embodiments, calculating, by the simulation system, a portion of the virtual vehicle within the virtual world that is visible from the virtual position of the point of view includes calculating a field of view from the virtual position of the point of view and providing, to the display system, the portion of the virtual vehicle visible from the virtual position of the point of view includes displaying the portion of the virtual vehicle within the field of view.

In some embodiments, calculating, by the simulation system, a portion of the virtual vehicle within the virtual world that is visible from the position of the virtual point of view includes calculating a field of view from the virtual position of the point of view and providing, to the display system, the portion of the virtual vehicle visible from the virtual position of the point of view consists of displaying the portion of the virtual vehicle visible within the field of view.

In some embodiments, a method for displaying a virtual vehicle includes means for identifying a position of a physical vehicle at a racecourse, means for identifying a position of a point of view at the racecourse, and means for providing, to a display system, a portion of the virtual vehicle visible from a virtual position of the point of view calculated within a virtual world based on the position of the point of view at the racecourse. As an exemplary advantage, embodiments described herein may allow a physical vehicle operator to compete with a virtual vehicle operator. Further, by displaying a representation of the portion of the virtual vehicle visible from the virtual position of the point of view, the competition between the physical and virtual vehicle operators may appear more realistic.

In some embodiments, the portion of the virtual vehicle visible from the virtual position of the point of view includes a portion of the virtual vehicle that is unobscured, from the virtual position of the point of view, by a representation of the physical vehicle at a virtual position of the physical vehicle in the virtual world. In some embodiments, the method further includes means for simulating, by the simulation system, an interaction between the virtual vehicle and the representation of the physical vehicle in the virtual world, the portion of the virtual vehicle visible from the virtual position of the point of view is calculated based on the interaction.

In some embodiments, the position of the point of view at the racecourse includes a point of view of an operator of the physical vehicle, and means for identifying a position of a point of view at the racecourse includes means for detecting, at a sensor, the point of view of the operator of the physical vehicle, the method further including: means for identifying a position of a physical object; means for receiving kinematics information of the virtual vehicle; means for generating, at a display system, a representation of the virtual vehicle based on the position of the physical object, the position of the point of view at the racecourse, and the kinematics information; and means for displaying the representation of the virtual vehicle such that the virtual vehicle is aligned with the physical object from the perspective of the position of the point of view at the racecourse.

In some embodiments, the method further includes means for generating, at a display system, the representation of the portion of the virtual vehicle visible from the virtual position of the point of view.

In some embodiments, the method further includes means for displaying, by the display system, a series of representations of the virtual vehicle over a period of time to simulate a trajectory of the virtual vehicle on the racecourse, the series of representations includes the representation of the portion of the virtual vehicle visible form the virtual position of the point of view. In some embodiments, a predicted trajectory of the virtual vehicle is displayed. The prediction may be based on current trajectory, acceleration, current vehicle parameters, etc. This may allow an audience member to anticipate if a virtual vehicle is likely to overtake a physical vehicle. The predicted trajectory may be presented as a line, such as a yellow line. Other displays may also be included, such as "GOING TO PASS!" or "GOING TO CRASH!"

In some embodiments, the method further includes means for storing, by the display system, a digital 3-D model of the virtual vehicle used to generate each representation from the series of representations, each representation is generated by the display system based on the digital 3-D model.

In some embodiments, the method further includes means for receiving a digital 3-D model of the virtual vehicle used to generate each representation from the series of representations, each representation is generated by the display system based on the digital 3-D model.

In some embodiments, the kinematics information includes one or more vectors of motion, one or more scalars of motion, a position vector, a GPS location, a velocity, an acceleration, an orientation, or a combination thereof of the virtual vehicle.

In some embodiments, means for identifying the position of the physical vehicle includes means for detecting one or more vectors of motion, one or more scalars of motion, a position vector, a GPS location, a velocity, an acceleration, an orientation, or a combination thereof of the virtual vehicle.

In some embodiments, means for identifying the position of the point of view at the racecourse includes means for detecting a spatial position of a head of an operator of the physical vehicle. In some embodiments, the method further includes means for transmitting, by a telemetry system coupled to the physical vehicle, the spatial position to a simulator system; means for receiving, at the telemetry system, information related to the portion of the virtual vehicle visible from the virtual position of the point of view; and means for displaying, to the operator of the physical vehicle, the representation of the portion of the virtual vehicle based on the information.

In some embodiments, the method further includes means for displaying the representation of the portion of the virtual vehicle includes: means for translating the information into a set of graphical elements, means for displaying the representation of the portion includes means for displaying the set of graphical elements. In some embodiments, the method further includes means for computing, at the simulation system, the information related to the portion visible from the virtual position of the point of view.

In some embodiments, means for displaying the series of representations of the virtual vehicle includes means for displaying the series of representation on a display of the physical vehicle, and the display is a transparent organic light-emitting diode (T-OLED) display that allows light to pass through the T-OLED to display the field of view to the operator.

In some embodiments, means for displaying the series of representations of the virtual vehicle includes means for displaying the series of representations on a display of the physical vehicle, and the display is an LCD display, the method further including: means for capturing, by a camera coupled to the physical vehicle, an image representing the field of view of the physical world as seen by the operator on the display in the physical vehicle; and means for outputting the image on a side of the LCD display to display the field of view to the operator, the series of representations are overlaid on the image displayed by the LCD display.

In some embodiments, means for displaying the series of representations of the virtual vehicle includes means for displaying the series of representations on a display of the physical vehicle, and the display includes a front windshield of the physical vehicle, one or more side windows of the physical vehicle, a rear windshield of the physical vehicle, one or more side mirrors, a rearview mirror, or a combination thereof.

In some embodiments, means for displaying the series of representations of the virtual vehicle includes means for displaying the series of representations on a display of a headset worn by the operator. In some embodiments, the headset is a helmet.

In some embodiments, means for identifying the position of the point of view at the racecourse includes means for detecting one or more of a spatial position of a user's eyes, a gaze direction of the user's eyes, or a focus point of the user's eyes.

In some embodiments, the method further includes: means for providing the position of the physical vehicle and the position of the point of view at the racecourse to a simulation system; means for calculating, by the simulation system, a virtual world including the virtual vehicle and a representation of the physical vehicle; means for calculating, by the simulation system, a virtual position of the point of view within the virtual world based on the position of the point of view at the racecourse; and means for calculating, by the simulation system, the portion of the virtual vehicle visible from the virtual position of the point of view, and means for providing, to a display system, the portion of the virtual vehicle visible from the virtual position of the point of view includes means for outputting, by the simulation system, the portion of the virtual vehicle visible from the virtual position of the point of view.

In some embodiments, means for identifying the position of the physical vehicle includes means for receiving a location of each of two portions of the vehicle.

In some embodiments, means for identifying the position of the physical vehicle includes means for receiving a location of one portion of the vehicle and an orientation of the vehicle. In some embodiments, means for receiving the orientation of the vehicle includes means for receiving gyroscope data.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse. In some embodiments, the position of the point of view at the racecourse includes a position of a camera present at a racecourse and the method further includes means for imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, means for identifying the position of the point of view at the racecourse includes at least one of means for measuring a point of gaze of eyes, means for tracking eye movement, means for tracking head position, means for identifying a vector from one or both eyes to a fixed point on the physical vehicle, means for identifying a vector from a point on the head to a fixed point on the physical vehicle, means for identifying a vector from a point on eye-wear to a fixed point on the physical vehicle, means for identifying a vector from a point on a head gear to a fixed point on the physical vehicle, means for identifying a vector from one or both eyes to a fixed point in a venue, means for identifying a vector from a point on the head to a fixed point in the venue, means for identifying a vector from a point on eye-wear to a fixed point in the venue, or means for identifying a vector from a point on a head gear to a fixed point in the venue. In some embodiments, means for identifying the position of the point of view at the racecourse includes means for measuring the point of gaze of the eyes and the means for measuring includes means for measuring light reflection or refraction from the eyes.

In some embodiments, means for providing the position of the physical vehicle and the position of the point of view at the racecourse includes means for wireless transmitting at least one position.

In some embodiments, means for calculating a virtual world includes means for transforming physical coordinates of the physical vehicle to coordinates in the virtual world and the virtual position of the physical vehicle includes the virtual coordinates.

In some embodiments, means for calculating the portion of the virtual vehicle visible from the virtual position of the point of view includes: means for calculating a representation of the physical vehicle in the virtual world, means for calculating a representation of a physical object in the virtual world between the point of view and the virtual vehicle within the virtual world, and means for extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion.

In some embodiments, means for extracting the portions of the virtual vehicle may include means for determining which pixels are obstructed by other representations, and only displaying pixels that are not obstructed by other representations. In some embodiments, means for extracting the portions of the virtual vehicle may include means for setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, means for calculating the representation of the physical object between the virtual position of the point of view and the representation of the physical vehicle includes means for accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the virtual position of the point of view includes a virtual reflection. In some embodiments, the virtual reflection is at least one of a reflection of the virtual vehicle and a reflection on the virtual vehicle.

In some embodiments, means for calculating, by the simulation system, a portion of the virtual vehicle within the virtual world that is visible from the virtual position of the point of view includes means for calculating a field of view from the virtual position of the point of view and means for providing, to the display system, the portion of the virtual vehicle visible from the virtual position of the point of view includes displaying the portion of the virtual vehicle within the field of view.

In some embodiments, means for calculating, by the simulation system, a portion of the virtual vehicle within the virtual world that is visible from the position of the virtual point of view includes means for calculating a field of view from the virtual position of the point of view and means for providing, to the display system, the portion of the virtual vehicle visible from the virtual position of the point of view consists of means for displaying the portion of the virtual vehicle visible within the field of view.

In some embodiments, a system for displaying virtual vehicles includes a first sensor detecting a position of a physical vehicle at a racecourse, a second sensor detecting a position of a point of view at the racecourse, and a simulation system outputting a portion of the virtual vehicle visible from a virtual position of the point of view. As an exemplary advantage, embodiments described herein may allow a physical vehicle operator to compete with a virtual vehicle operator. Further, by displaying a portion of the virtual vehicle visible from the position of the point of view at the racecourse, the competition between the physical and virtual vehicle operators may appear more realistic.

In some embodiments, the portion of the virtual vehicle visible from the virtual position of the point of view includes a portion of the virtual vehicle that is unobscured, from the virtual position of the point of view, by a representation of the physical vehicle at a virtual position of the physical vehicle in the virtual world.

In some embodiments, the system further includes a simulation system configured to simulate an interaction between the virtual vehicle and the representation of the physical vehicle in the virtual world, the portion of the virtual vehicle visible from the virtual position of the point of view is calculated based on the interaction.

In some embodiments, the system further includes the first sensor is coupled to the physical vehicle, the second sensor is configured to detect eye position of an operator of the physical vehicle, and the display system is coupled to the physical vehicle and configured to: receive kinematics information of a virtual vehicle; identify a position of a physical object in the field of view of the operator, generate a representation of the virtual vehicle based on the position of the physical object, the point of view, and the kinematics information; and display the representation of the virtual vehicle such that the virtual vehicle is aligned with the physical object from the perspective of the point of view.

In some embodiments, the system further includes a display system configured to generate the representation of the portion of the virtual vehicle visible from the virtual position of the point of view.

In some embodiments, displaying the representation of the virtual vehicle includes displaying the representation on a display screen of the physical vehicle, and the display system is further configured to: display, on the display screen, a series of representations of the virtual vehicle over a period of time to simulate a trajectory of the virtual vehicle on the racecourse, the series of representations includes the representation of the portion of the virtual vehicle visible form the virtual position of the point of view. In some embodiments, a predicted trajectory of the virtual vehicle is be displayed. The prediction may be based on current trajectory, acceleration, current vehicle parameters, etc. This may allow an audience member to anticipate if a virtual vehicle is likely to overtake a physical vehicle. The predicted trajectory may be presented as a line, such as a yellow line. Other displays may also be included, such as "GOING TO PASS!" or "GOING TO CRASH!"

In some embodiments, displaying the series of representations of the virtual vehicle includes displaying the series of representations on a display of the physical vehicle, and the display system is further configured to: store a digital 3-D model of the virtual vehicle used to generate each representation from the series of representations, each representation is generated by the display system based on the digital 3-D model.

In some embodiments, the display system is further configured to receive a digital 3-D model of the virtual vehicle used to generate each representation from the series of representations, each representation is generated by the display system based on the digital 3-D model.

In some embodiments, the kinematics information includes one or more vectors of motion, one or more scalars of motion, a position vector, a GPS location, a velocity, an acceleration, an orientation, or a combination thereof of the virtual vehicle.

In some embodiments, the first sensor is configured to detect the position of the physical vehicle by detecting one or more vectors of motion, one or more scalars of motion, a position vector, a GPS location, a velocity, an acceleration, an orientation, or a combination thereof of the virtual vehicle.

In some embodiments, the first sensor is configured to detect the point of view of the operator by: detecting a spatial position of a head of the operator.

In some embodiments, the display system is further configured to: transmit the spatial position to a simulation system; receive information related to the portion of the virtual vehicle visible from the virtual position of the point of view; and display, to the operator of the physical vehicle, the portion of the virtual vehicle.

In some embodiments, the display system is further configured to display the series of representations of the virtual vehicle by: translating the information into a set of graphical elements, displaying the representation of the portion includes displaying the set of graphical elements. In some embodiments, the information related to the portion visible from the virtual position of the point of view is computed at the simulation system.

In some embodiments, the system further includes: a transparent organic light-emitting diode (T-OLED) display that allows light to pass through the T-OLED to display the field of view to the operator, and the display system is configured to display the series of representations on the T-OLED display to display the representation of the virtual vehicle.

In some embodiments, the system further includes an LCD display; a camera coupled to the physical vehicle and configured to capture an image representing the field of view of the physical world as seen by the operator on the LCD display in the physical vehicle, and the display system is configured to: output the image on a side of the LCD display to display the field of view to the operator, and overlay the series of representations on the image displayed by the LCD display.

In some embodiments, the system further includes a display that includes a windshield of the physical vehicle, one or more side windows of the physical vehicle, a rear windshield of the physical vehicle, or a combination thereof, and the display system is configured to display the representation of the virtual vehicle on the display.

In some embodiments, the system includes a headset worn by the operator, the headset including a display, and the display system is configured to display the series of representations of the virtual vehicle on the display. In some embodiments, the headset is a helmet.

In some embodiments, the second sensor detects one or more of a spatial position of a user's eyes, a gaze direction of the user's eyes, or a focus point of the user's eyes.

In some embodiments, the system includes a simulation system configured to: receive the position of the physical vehicle and the position of the point of view at the racecourse; calculate a virtual world including the virtual vehicle and a representation of the physical vehicle; calculate a virtual position of the point of view within the virtual world based on the position of the point of view at the racecourse; calculate the portion of the virtual vehicle visible from the virtual position of the point of view; and output, to the display system, the portion of the virtual vehicle visible from the virtual position of the point of view.

In some embodiments, the first sensor receives a location of each of two portions of the vehicle.

In some embodiments, the first sensor receives a location of one portion of the vehicle and an orientation of the vehicle. In some embodiments, receiving the orientation of the vehicle includes receiving gyroscope data.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse.

In some embodiments, the position of the point of view at the racecourse includes a position of a camera present at a racecourse and imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, the second sensor is configured to detect the position of the point of view at the racecourse by at least one of measuring the point of gaze of eyes, tracking eye movement, tracking head position, identifying a vector from one or both eyes to a fixed point on the physical vehicle, identifying a vector from a point on the head to a fixed point on the physical vehicle, identifying a vector from a point on eye-wear to a fixed point on the physical vehicle, identifying a vector from a point on a head gear to a fixed point on the physical vehicle, identifying a vector from one or both eyes to a fixed point in a venue, identifying a vector from a point on the head to a fixed point in the venue, or identifying a vector from a point on eye-wear to a fixed point in the venue, identifying a vector from a point on a head gear to a fixed point in the venue. In some embodiments, identifying the position of the point of view at the racecourse includes measuring the point of gaze of the eyes and the measuring includes measuring light reflection or refraction from the eyes.

In some embodiments, receiving the position of the physical vehicle and the position of the point of view at the racecourse includes wireless receiving at least one position.

In some embodiments, calculating a virtual world includes transforming physical coordinates of the physical vehicle to coordinates in the virtual world and the virtual position of the physical vehicle includes the virtual coordinates.

In some embodiments, calculating a portion of the virtual vehicle visible from the virtual position of the point of view includes: calculating a representation of the physical vehicle in the virtual world, calculating a representation of a physical object in the virtual world between the point of view and the virtual vehicle within the virtual world, and extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion.

In some embodiments, extracting the portions of the virtual vehicle may include determining which pixels are obstructed by other representations, and only displaying pixels that are not obstructed by other representations. In some embodiments, extracting the portions of the virtual vehicle may include setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, calculating the representation of the physical object between the virtual position of the point of view and the representation of the physical vehicle includes accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the position of the point of view at the racecourse includes a virtual reflection. In some embodiments, the virtual reflection is at least one of a reflection of the virtual vehicle and a reflection on the virtual vehicle.

In some embodiments, the system further includes the simulation system configured to calculate a portion of the virtual vehicle visible from the virtual position of the point of view by calculating a field of view from the virtual position of the point of view and providing, to the display system, the portion of the virtual vehicle visible from the virtual position of the point of view includes displaying the portion of the virtual vehicle within the field of view.

In some embodiments, the system further includes the simulation system configured to calculate a portion of the virtual vehicle visible from the virtual position of the point of view by calculating a field of view from the virtual position of the point of view and providing, to the display system, the portion of the virtual vehicle visible from the virtual position of the point of view consists of displaying the portion of the virtual vehicle visible within the field of view.

DESCRIPTION OF THE FIGURES

FIGS. 3A-D are diagrams showing how visible portions of virtual vehicles are displayed on a display, according to some embodiments.

DETAILED DESCRIPTION

Figure 1:
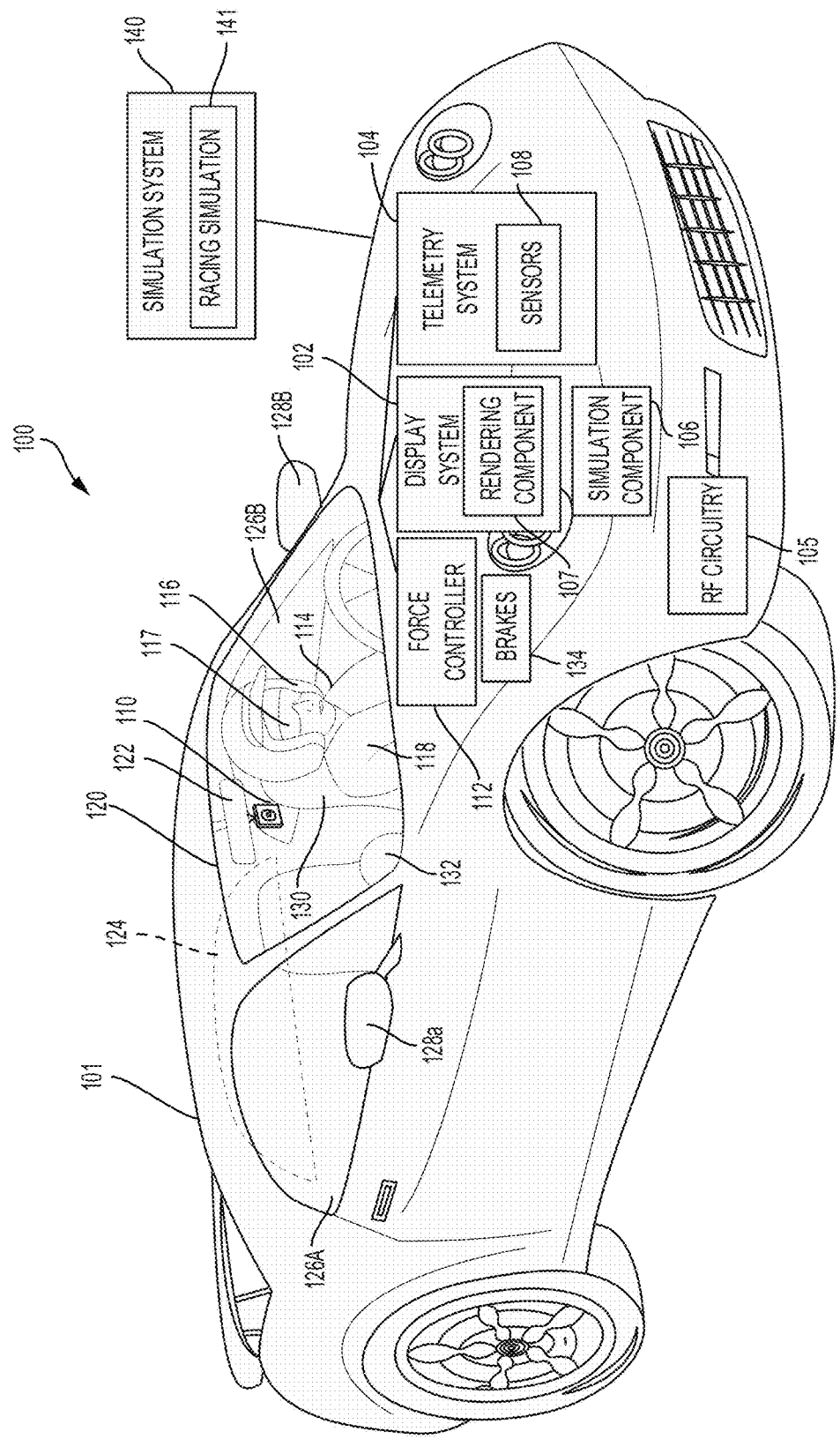
FIG. 1 is a diagram of a physical vehicle, according to some embodiments.

Embodiments described herein merge real world and virtual world racing competitions. For example, real world racing champions and virtual world racing champions can compete to determine an overall champion. Advantageously, each champion can stay within their respective "world" and still compete with a champion from another "world." In effect, embodiments described herein enable live participants to compete against virtual participants.

The terms "physical" and "real-world" are used interchangeably herein and to contrast with "virtual world." For example, a "physical vehicle" or "real-world vehicle" can be physically present on or at a racecourse. A "virtual vehicle" cannot be physically present on the same racecourse. For example, a "virtual vehicle" may be a graphically generated vehicle that is shown on a display. In some embodiments, a "virtual vehicle" is a representation in a software-based environment.

In some embodiments, a method for displaying a virtual vehicle includes identifying a position of a physical vehicle at a racecourse, identifying a position of a point of view at the racecourse, and providing, to a display system, a portion of the virtual vehicle visible from a virtual position of the point of view. Problems solved by embodiments disclosed herein can include overcoming the lack of realism experienced by users of prior solutions. In some embodiments herein, providing visible portions of the virtual vehicle to the user increases the realism experienced by the user. The increased realism provides a reliable and re-producible user experience by providing a real-world race that includes a virtual vehicle.

In some embodiments, the visible portion of the virtual vehicle is calculated based on a virtual position of the physical vehicle in a virtual world, a virtual position of the point of view in the virtual world, and a virtual position of the virtual vehicle in the virtual world. Problems solved by embodiments disclosed herein can include how to provide a visible portion of a virtual vehicle. In some embodiments herein, providing visible portions of the virtual vehicle through a virtual calculation of the visible portion increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, the portion of the virtual vehicle visible from the virtual position of the point of view includes a portion of the virtual vehicle that is unobscured, from the virtual position of the point of view, by a representation of the physical vehicle at a virtual position of the physical vehicle in the virtual world.

In some embodiments, the method further includes simulating, by the simulation system, an interaction between the virtual vehicle and the representation of the physical vehicle in the virtual world, the portion of the virtual vehicle visible from the virtual position of the point of view is calculated based on the interaction.

In some embodiments, the position of the point of view at the racecourse includes a point of view of an operator of the physical vehicle, and identifying a position of a point of view at the racecourse includes detecting, at a sensor, the point of view of the operator of the physical vehicle, the method further including: identifying a position of a physical object; receiving kinematics information of the virtual vehicle; generating, at a display system, a representation of the virtual vehicle based on the position of the physical object, the position of the point of view at the racecourse, and the kinematics information; and displaying the representation of the virtual vehicle such that the virtual vehicle is aligned with the physical object from the perspective of the position of the point of view at the racecourse.

In some embodiments, the method further includes generating, at a display system, the representation of the portion of the virtual vehicle visible from the virtual position of the point of view.

In some embodiments, the method further includes displaying, by the display system, a series of representations of the virtual vehicle over a period of time to simulate a trajectory of the virtual vehicle on the racecourse, the series of representations includes the representation of the portion of the virtual vehicle visible form the virtual position of the point of view. In some embodiments, a predicted trajectory of the virtual vehicle is displayed. The prediction may be based on current trajectory, acceleration, current vehicle parameters, etc. This may allow an audience member to anticipate if a virtual vehicle is likely to overtake a physical vehicle. The predicted trajectory may be presented as a line, such as a yellow line. Other displays may also be included, such as "GOING TO PASS!" or "GOING TO CRASH!"

In some embodiments, the method further includes storing, by the display system, a digital 3-D model of the virtual vehicle used to generate each representation from the series of representations, each representation is generated by the display system based on the digital 3-D model.

In some embodiments, the method further includes receiving a digital 3-D model of the virtual vehicle used to generate each representation from the series of representations, each representation is generated by the display system based on the digital 3-D model.

In some embodiments, the kinematics information includes one or more vectors of motion, one or more scalars of motion, a position vector, a GPS location, a velocity, an acceleration, an orientation, or a combination thereof of the virtual vehicle.

In some embodiments, identifying the position of the physical vehicle includes detecting one or more vectors of motion, one or more scalars of motion, a position vector, a GPS location, a velocity, an acceleration, an orientation, or a combination thereof of the virtual vehicle.

In some embodiments, identifying the position of the point of view at the racecourse includes detecting a spatial position of a head of an operator of the physical vehicle. In some embodiments, the method further includes transmitting, by a telemetry system coupled to the physical vehicle, the spatial position to a simulator system; receiving, at the telemetry system, information related to the portion of the virtual vehicle visible from the virtual position of the point of view; and displaying, to the operator of the physical vehicle, the representation of the portion of the virtual vehicle based on the information.

In some embodiments, the method further includes displaying the representation of the portion of the virtual vehicle includes: translating the information into a set of graphical elements, displaying the representation of the portion includes displaying the set of graphical elements. In some embodiments, the method further includes computing, at the simulation system, the information related to the portion visible from the virtual position of the point of view.

In some embodiments, displaying the series of representations of the virtual vehicle includes displaying the series of representation on a display of the physical vehicle, and the display is a transparent organic light-emitting diode (T-OLED) display that allows light to pass through the T-OLED to display the field of view to the operator.

In some embodiments, displaying the series of representations of the virtual vehicle includes displaying the series of representations on a display of the physical vehicle, and the display is an LCD display, the method further including: capturing, by a camera coupled to the physical vehicle, an image representing the field of view of the physical world as seen by the operator on the display in the physical vehicle; and outputting the image on a side of the LCD display to display the field of view to the operator, the series of representations are overlaid on the image displayed by the LCD display.

In some embodiments, displaying the series of representations of the virtual vehicle includes displaying the series of representations on a display of the physical vehicle, and the display includes a front windshield of the physical vehicle, one or more side windows of the physical vehicle, a rear windshield of the physical vehicle, one or more side mirrors, a rearview mirror, or a combination thereof.

In some embodiments, displaying the series of representations of the virtual vehicle includes displaying the series of representations on a display of a headset worn by the operator. In some embodiments, the headset is a helmet.

In some embodiments, identifying the position of the point of view at the racecourse includes detecting one or more of a spatial position of a user's eyes, a gaze direction of the user's eyes, or a focus point of the user's eyes.

In some embodiments, the method further includes: providing the position of the physical vehicle and the position of the point of view at the racecourse to a simulation system; calculating, by the simulation system, a virtual world including the virtual vehicle and a representation of the physical vehicle; calculating, by the simulation system, a virtual position of the point of view within the virtual world based on the position of the point of view at the racecourse; and calculating, by the simulation system, the portion of the virtual vehicle visible from the virtual position of the point of view, and providing, to a display system, the portion of the virtual vehicle visible from the virtual position of the point of view includes outputting, by the simulation system, the portion of the virtual vehicle visible from the virtual position of the point of view. Problems solved by embodiments disclosed herein can include how to calculate a visible portion of a virtual vehicle. In some embodiments herein, calculating the visible portion of the virtual vehicle in a virtual world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, identifying the position of the physical vehicle includes receiving a location of each of two portions of the vehicle. In some embodiments, identifying the position of the physical vehicle includes receiving a location of one portion of the vehicle and an orientation of the vehicle. In some embodiments, receiving the orientation of the vehicle includes receiving gyroscope data. Problems solved by embodiments disclosed herein can include how to correctly position a physical vehicle in a virtual world for determining a visible portion of a virtual vehicle. In some embodiments herein, using a measure of orientation provides for accurate placement of the physical vehicle in the virtual world. The increased accuracy provides for a more faithful display of the visible portions of the vehicle, thereby improving the user experience.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse. In some embodiments, the position of the point of view at the racecourse includes a position of a camera present at a racecourse and imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, identifying the position of the point of view at the racecourse includes at least one of measuring a point of gaze of eyes, tracking eye movement, tracking head position, identifying a vector from one or both eyes to a fixed point on the physical vehicle, identifying a vector from a point on the head to a fixed point on the physical vehicle, identifying a vector from a point on eye-wear to a fixed point on the physical vehicle, identifying a vector from a point on a head gear to a fixed point on the physical vehicle, identifying a vector from one or both eyes to a fixed point in a venue, identifying a vector from a point on the head to a fixed point in the venue, identifying a vector from a point on eye-wear to a fixed point in the venue, or identifying a vector from a point on a head gear to a fixed point in the venue. In some embodiments, identifying the position of the point of view at the racecourse includes measuring the point of gaze of the eyes and the measuring includes measuring light reflection or refraction from the eyes.

In some embodiments, providing the position of the physical vehicle and the position of the point of view at the racecourse includes wireless transmitting at least one position.

In some embodiments, calculating a virtual world includes transforming physical coordinates of the physical vehicle to coordinates in the virtual world and the virtual position of the physical vehicle includes the virtual coordinates.

In some embodiments, calculating the portion of the virtual vehicle visible from the virtual position of the point of view includes: calculating a representation of the physical vehicle in the virtual world, calculating a representation of a physical object in the virtual world between the point of view and the virtual vehicle within the virtual world, and extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion. Problems solved by embodiments disclosed herein can include how to calculate a visible portion of a virtual vehicle, including more than just the portion that is not obscured by the physical vehicle. In some embodiments herein, calculating the visible portion in a virtual world that includes physical objects in the real world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, extracting the portions of the virtual vehicle may include determining which pixels are obstructed by other representations, and only displaying pixels that are not obstructed by other representations. In some embodiments, extracting the portions of the virtual vehicle may include setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, calculating the representation of the physical object between the virtual position of the point of view and the representation of the physical vehicle includes accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the virtual position of the point of view includes a virtual reflection. In some embodiments, the virtual reflection is at least one of a reflection of the virtual vehicle and a reflection on the virtual vehicle.

In some embodiments, calculating, by the simulation system, a portion of the virtual vehicle within the virtual world that is visible from the virtual position of the point of view includes calculating a field of view from the virtual position of the point of view and providing, to the display system, the portion of the virtual vehicle visible from the virtual position of the point of view includes displaying the portion of the virtual vehicle within the field of view.

In some embodiments, calculating, by the simulation system, a portion of the virtual vehicle within the virtual world that is visible from the position of the virtual point of view includes calculating a field of view from the virtual position of the point of view and providing, to the display system, the portion of the virtual vehicle visible from the virtual position of the point of view consists of displaying the portion of the virtual vehicle visible within the field of view.

In some embodiments, the method may facilitate a competition between two virtual vehicles on a physical racecourse. In a scenario where two virtual vehicles compete on a physical racecourse without any physical vehicles, then the step of "identifying a position of a physical vehicle" would be unnecessary. The method could include identifying a position of a point of view at the racecourse and providing, to a display system, a portion of the virtual vehicle visible from the position of the point of view at the racecourse. All aspects of the foregoing methods not concerning to the position of the physical vehicle could be applied in such embodiment. In some embodiments, the virtual vehicles are given special properties and a video game appearance. In some embodiments, video game attributes (i.e., virtual objects) can be similarly applied to physical vehicles by overlaying those video game attributes on top of the physical vehicles. For example, cars can be given boosts, machine guns, missiles (other graphical virtual objects put into the real world view), virtual jumps, etc. Viewers at the racecourse and at home could view the virtual competitors on the physical racecourse as if competing in the real-world.

In some embodiments, a method for displaying a virtual vehicle includes means for identifying a position of a physical vehicle at a racecourse, means for identifying a position of a point of view at the racecourse, and means for providing, to a display system, a portion of the virtual vehicle visible from a virtual position of the point of view calculated within a virtual world based on the position of the point of view at the racecourse. Problems solved by embodiments disclosed herein can include overcoming the lack of realism experienced by users of prior solutions. In some embodiments herein, providing visible portions of the virtual vehicle to the user increases the realism experienced by the user. The increased realism provides a reliable and re-producible user experience by providing a real-world race that includes a virtual vehicle.

In some embodiments, the portion of the virtual vehicle visible from the virtual position of the point of view includes a portion of the virtual vehicle that is unobscured, from the virtual position of the point of view, by a representation of the physical vehicle at a virtual position of the physical vehicle in the virtual world. Problems solved by embodiments disclosed herein can include how to provide a visible portion of a virtual vehicle. In some embodiments herein, providing visible portions of the virtual vehicle through a virtual calculation of the visible portion increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, the method further includes means for simulating, by the simulation system, an interaction between the virtual vehicle and the representation of the physical vehicle in the virtual world, the portion of the virtual vehicle visible from the virtual position of the point of view is calculated based on the interaction.

In some embodiments, the position of the point of view at the racecourse includes a point of view of an operator of the physical vehicle, and means for identifying a position of a point of view at the racecourse includes means for detecting, at a sensor, the point of view of the operator of the physical vehicle, the method further including: means for identifying a position of a physical object; means for receiving kinematics information of the virtual vehicle; means for generating, at a display system, a representation of the virtual vehicle based on the position of the physical object, the position of the point of view at the racecourse, and the kinematics information; and means for displaying the representation of the virtual vehicle such that the virtual vehicle is aligned with the physical object from the perspective of the position of the point of view at the racecourse. Problems solved by embodiments disclosed herein can include how to calculate a visible portion of a virtual vehicle. In some embodiments herein, calculating the visible portion of the virtual vehicle in a virtual world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, the method further includes means for generating, at a display system, the representation of the portion of the virtual vehicle visible from the virtual position of the point of view.

In some embodiments, the method further includes means for displaying, by the display system, a series of representations of the virtual vehicle over a period of time to simulate a trajectory of the virtual vehicle on the racecourse, the series of representations includes the representation of the portion of the virtual vehicle visible form the virtual position of the point of view. In some embodiments, a predicted trajectory of the virtual vehicle is displayed. The prediction may be based on current trajectory, acceleration, current vehicle parameters, etc. This may allow an audience member to anticipate if a virtual vehicle is likely to overtake a physical vehicle. The predicted trajectory may be presented as a line, such as a yellow line. Other displays may also be included, such as "GOING TO PASS!" or "GOING TO CRASH!"

In some embodiments, the method further includes means for storing, by the display system, a digital 3-D model of the virtual vehicle used to generate each representation from the series of representations, each representation is generated by the display system based on the digital 3-D model.

In some embodiments, the method further includes means for receiving a digital 3-D model of the virtual vehicle used to generate each representation from the series of representations, each representation is generated by the display system based on the digital 3-D model.

In some embodiments, the kinematics information includes one or more vectors of motion, one or more scalars of motion, a position vector, a GPS location, a velocity, an acceleration, an orientation, or a combination thereof of the virtual vehicle.

In some embodiments, means for identifying the position of the physical vehicle includes means for detecting one or more vectors of motion, one or more scalars of motion, a position vector, a GPS location, a velocity, an acceleration, an orientation, or a combination thereof of the virtual vehicle.

In some embodiments, means for identifying the position of the point of view at the racecourse includes means for detecting a spatial position of a head of an operator of the physical vehicle. In some embodiments, the method further includes means for transmitting, by a telemetry system coupled to the physical vehicle, the spatial position to a simulator system; means for receiving, at the telemetry system, information related to the portion of the virtual vehicle visible from the virtual position of the point of view; and means for displaying, to the operator of the physical vehicle, the representation of the portion of the virtual vehicle based on the information.

In some embodiments, the method further includes means for displaying the representation of the portion of the virtual vehicle includes: means for translating the information into a set of graphical elements, means for displaying the representation of the portion includes means for displaying the set of graphical elements. In some embodiments, the method further includes means for computing, at the simulation system, the information related to the portion visible from the virtual position of the point of view.

In some embodiments, means for displaying the series of representations of the virtual vehicle includes means for displaying the series of representation on a display of the physical vehicle, and the display is a transparent organic light-emitting diode (T-OLED) display that allows light to pass through the T-OLED to display the field of view to the operator.

In some embodiments, means for displaying the series of representations of the virtual vehicle includes means for displaying the series of representations on a display of the physical vehicle, and the display is an LCD display, the method further including: means for capturing, by a camera coupled to the physical vehicle, an image representing the field of view of the physical world as seen by the operator on the display in the physical vehicle; and means for outputting the image on a side of the LCD display to display the field of view to the operator, the series of representations are overlaid on the image displayed by the LCD display.

In some embodiments, means for displaying the series of representations of the virtual vehicle includes means for displaying the series of representations on a display of the physical vehicle, and the display includes a front windshield of the physical vehicle, one or more side windows of the physical vehicle, a rear windshield of the physical vehicle, one or more side mirrors, a rearview mirror, or a combination thereof.

In some embodiments, means for displaying the series of representations of the virtual vehicle includes means for displaying the series of representations on a display of a headset worn by the operator. In some embodiments, the headset is a helmet.

In some embodiments, means for identifying the position of the point of view at the racecourse includes means for detecting one or more of a spatial position of a user's eyes, a gaze direction of the user's eyes, or a focus point of the user's eyes.

In some embodiments, the method further includes: means for providing the position of the physical vehicle and the position of the point of view at the racecourse to a simulation system; means for calculating, by the simulation system, a virtual world including the virtual vehicle and a representation of the physical vehicle; means for calculating, by the simulation system, a virtual position of the point of view within the virtual world based on the position of the point of view at the racecourse; and means for calculating, by the simulation system, the portion of the virtual vehicle visible from the virtual position of the point of view, and means for providing, to a display system, the portion of the virtual vehicle visible from the virtual position of the point of view includes means for outputting, by the simulation system, the portion of the virtual vehicle visible from the virtual position of the point of view.

In some embodiments, means for identifying the position of the physical vehicle includes means for receiving a location of each of two portions of the vehicle.

In some embodiments, means for identifying the position of the physical vehicle includes means for receiving a location of one portion of the vehicle and an orientation of the vehicle. In some embodiments, means for receiving the orientation of the vehicle includes means for receiving gyroscope data. Problems solved by embodiments disclosed herein can include how to correctly position a physical vehicle in a virtual world for determining a visible portion of a virtual vehicle. In some embodiments herein, using a measure of orientation provides for accurate placement of the physical vehicle in the virtual world. The increased accuracy provides for a more faithful display of the visible portions of the vehicle, thereby improving the user experience.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse. In some embodiments, the position of the point of view at the racecourse includes a position of a camera present at a racecourse and the method further includes means for imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, means for identifying the position of the point of view at the racecourse includes at least one of means for measuring a point of gaze of eyes, means for tracking eye movement, means for tracking head position, means for identifying a vector from one or both eyes to a fixed point on the physical vehicle, means for identifying a vector from a point on the head to a fixed point on the physical vehicle, means for identifying a vector from a point on eye-wear to a fixed point on the physical vehicle, means for identifying a vector from a point on a head gear to a fixed point on the physical vehicle, means for identifying a vector from one or both eyes to a fixed point in a venue, means for identifying a vector from a point on the head to a fixed point in the venue, means for identifying a vector from a point on eye-wear to a fixed point in the venue, or means for identifying a vector from a point on a head gear to a fixed point in the venue. In some embodiments, means for identifying the position of the point of view at the racecourse includes means for measuring the point of gaze of the eyes and the means for measuring includes means for measuring light reflection or refraction from the eyes.

In some embodiments, means for providing the position of the physical vehicle and the position of the point of view at the racecourse includes means for wireless transmitting at least one position.

In some embodiments, means for calculating a virtual world includes means for transforming physical coordinates of the physical vehicle to coordinates in the virtual world and the virtual position of the physical vehicle includes the virtual coordinates.

In some embodiments, means for calculating the portion of the virtual vehicle visible from the virtual position of the point of view includes: means for calculating a representation of the physical vehicle in the virtual world, means for calculating a representation of a physical object in the virtual world between the point of view and the virtual vehicle within the virtual world, and means for extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion. Problems solved by embodiments disclosed herein can include how to calculate a visible portion of a virtual vehicle, including more than just the portion that is not obscured by the physical vehicle. In some embodiments herein, calculating the visible portion in a virtual world that includes physical objects in the real world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, means for extracting the portions of the virtual vehicle may include means for determining which pixels are obstructed by other representations, and only displaying pixels that are not obstructed by other representations. In some embodiments, means for extracting the portions of the virtual vehicle may include means for setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, means for calculating the representation of the physical object between the virtual position of the point of view and the representation of the physical vehicle includes means for accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the position of the point of view at the racecourse includes a virtual reflection. In some embodiments, the virtual reflection is at least one of a reflection of the virtual vehicle and a reflection on the virtual vehicle.

In some embodiments, means for calculating, by the simulation system, a portion of the virtual vehicle within the virtual world that is visible from the virtual position of the point of view includes means for calculating a field of view from the virtual position of the point of view and means for providing, to the display system, the portion of the virtual vehicle visible from the virtual position of the point of view includes displaying the portion of the virtual vehicle within the field of view.

In some embodiments, means for calculating, by the simulation system, a portion of the virtual vehicle within the virtual world that is visible from the position of the virtual point of view includes means for calculating a field of view from the virtual position of the point of view and means for providing, to the display system, the portion of the virtual vehicle visible from the virtual position of the point of view consists of means for displaying the portion of the virtual vehicle within the field of view.

In some embodiments, a system for displaying virtual vehicles includes a first sensor detecting a position of a physical vehicle at a racecourse, a second sensor detecting a position of a point of view at the racecourse, and a simulation system outputting a portion of the virtual vehicle visible from a virtual position of the point of view. Problems solved by embodiments disclosed herein can include overcoming the lack of realism experienced by users of prior solutions. In some embodiments herein, providing visible portions of the virtual vehicle to the user increases the realism experienced by the user. The increased realism provides a reliable and re-producible user experience by providing a real-world race that includes a virtual vehicle.

In some embodiments, the simulation system determines the visible portion of the virtual vehicle based on a virtual position of the physical vehicle in a virtual world, a virtual position of the point of view in the virtual world, and a virtual position of the virtual vehicle in the virtual world. Problems solved by embodiments disclosed herein can include how to provide a visible portion of a virtual vehicle. In some embodiments herein, providing visible portions of the virtual vehicle through a virtual calculation of the visible portion increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, the portion of the virtual vehicle visible from the virtual position of the point of view includes a portion of the virtual vehicle that is unobscured, from the virtual position of the point of view, by a representation of the physical vehicle at the virtual position of the physical vehicle.

In some embodiments, the system further includes the simulation system configured to simulate an interaction between the virtual vehicle and the representation of the physical vehicle in the virtual world, the portion of the virtual vehicle visible from the virtual position of the point of view is calculated based on the interaction.

In some embodiments, the system includes a simulation system configured to: receive the position of the physical vehicle and the position of the point of view at the racecourse; calculate a virtual world including the virtual vehicle and a representation of the physical vehicle; calculate a virtual position of the point of view within the virtual world based on the position of the point of view at the racecourse; calculate the portion of the virtual vehicle visible from the virtual position of the point of view; and output, to the display system, the portion of the virtual vehicle visible from the virtual position of the point of view. Problems solved by embodiments disclosed herein can include how to calculate a visible portion of a virtual vehicle. In some embodiments herein, calculating the visible portion of the virtual vehicle in a virtual world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, the first sensor receives a location of each of two portions of the vehicle. In some embodiments, the first sensor receives a location of one portion of the vehicle and an orientation of the vehicle. In some embodiments, receiving the orientation of the vehicle includes receiving gyroscope data. Problems solved by embodiments disclosed herein can include how to correctly position a physical vehicle in a virtual world for determining a visible portion of a virtual vehicle. In some embodiments herein, using a measure of orientation provides for accurate placement of the physical vehicle in the virtual world. The increased accuracy provides for a more faithful display of the visible portions of the vehicle, thereby improving the user experience.

In some embodiments, the position of the point of view at the racecourse includes a position of a point of view of an operator of the physical vehicle at the racecourse. In some embodiments, the position of the point of view at the racecourse includes a position of a point of view of an audience member present at a racecourse and observing the physical vehicle on the racecourse.

In some embodiments, the position of the point of view at the racecourse includes a position of a camera present at a racecourse and imaging the physical vehicle on the racecourse. In some embodiments, the camera images a portion of the racecourse on which the physical vehicle is racing. When the physical vehicle is travelling across the portion of the racecourse being captured by the camera, the camera may capture the physical vehicle in its video feed. When the physical vehicle is not travelling across the portion of the racecourse being captured by the camera, the camera may still capture the portion of the racecourse.

In some embodiments, the second sensor is configured to detect the position of the point of view at the racecourse by at least one of measuring the point of gaze of eyes, tracking eye movement, tracking head position, identifying a vector from one or both eyes to a fixed point on the physical vehicle, identifying a vector from a point on the head to a fixed point on the physical vehicle, identifying a vector from a point on eye-wear to a fixed point on the physical vehicle, identifying a vector from a point on a head gear to a fixed point on the physical vehicle, identifying a vector from one or both eyes to a fixed point in a venue, identifying a vector from a point on the head to a fixed point in the venue, identifying a vector from a point on eye-wear to a fixed point in the venue, or identifying a vector from a point on a head gear to a fixed point in the venue. In some embodiments, second sensor is configured to detect the position of the point of view at the racecourse by measuring light reflection or refraction from the eyes.

In some embodiments, receiving the position of the physical vehicle and the position of the point of view at the racecourse includes wireless receiving at least one position.

In some embodiments, calculating a virtual world includes transforming physical coordinates of the physical vehicle to coordinates in the virtual world and the virtual position of the physical vehicle includes the virtual coordinates.

In some embodiments, calculating a portion of the virtual vehicle visible from the position of the point of view at the racecourse includes: calculating a representation of the physical vehicle in the virtual world, calculating a representation of a physical object in the virtual world between the point of view and the virtual vehicle within the virtual world, and extracting a portion of the virtual vehicle that is unobscured, from the virtual position of the point of view, by the representation of the physical vehicle and the representation of the physical object. In some embodiments, the portion of the virtual vehicle within the virtual world that is visible from the virtual position of the point of view includes the unobscured portion. Problems solved by embodiments disclosed herein can include how to calculate a visible portion of a virtual vehicle, including more than just the portion that is not obscured by the physical vehicle. In some embodiments herein, calculating the visible portion in a virtual world that includes physical objects in the real world increases the accuracy of the visible portion determination. The increased accuracy provides a reliable and re-producible user experience by providing a real-world race that includes a virtual vehicle. In some embodiments herein, providing visible portions through a virtual calculation increases the efficiency of the calculation. The increased efficiency reduces power usage and improves representation speed for a more seamless user experience.

In some embodiments, extracting the portions of the virtual vehicle may include determining which pixels are obstructed by other representations, and only displaying pixels that are not obstructed by other representations. In some embodiments, extracting the portions of the virtual vehicle may include setting a pixel alpha value of zero percent (in RGBA space) for all pixels obstructed by other representations. For example, portions of the virtual vehicle may be obstructed by other virtual representations, e.g., another virtual vehicle, or representations of physical objects, e.g., objects within a physical vehicle or the physical vehicle itself. Any observed (from the virtual position of the point of view) pixel values can be used to provide the portions of the virtual vehicle that are visible from the virtual position of the point of view. In some embodiments, the pixels of unobscured and observed portions of the virtual vehicle can each be set to include an alpha value greater than zero percent (in RGBA space) to indicate that those unobscured pixels can be seen and should be displayed. In contrast, pixels set to an alpha value of zero percent indicate that those pixels are fully transparent, i.e., invisible, and would not be displayed.

In some embodiments, calculating the representation of the physical object between the virtual position of the point of view and the representation of the physical vehicle includes accessing a database of representations to obtain a virtual position of the physical object.

In some embodiments, the portion of the virtual vehicle visible from the virtual position of the point of view consists of portions of the virtual vehicle that are unobscured by other representations in the virtual world.

In some embodiments, the portion of the virtual vehicle visible from the virtual position of the point of view includes a virtual shadow in the virtual world. In some embodiments, the virtual shadow is at least one of a shadow projected by the virtual vehicle and a shadow projected onto the virtual vehicle. In some embodiments, the portion of the virtual vehicle visible from the virtual position of the point of view includes a virtual reflection. In some embodiments, the virtual reflection is at least one of a reflection of the virtual vehicle and a reflection on the virtual vehicle.

In some embodiments, calculating a portion of the virtual vehicle within the virtual world that is visible from the virtual position of the point of view includes calculating a field of view from the virtual position of the point of view and providing, to the display system, the portion of the virtual vehicle visible from the virtual position of the point of view includes displaying the portion of the virtual vehicle within the field of view.

In some embodiments, calculating a portion of the virtual vehicle within the virtual world that is visible from the position of the point of view at the racecourse includes calculating a field of view from the virtual position of the point of view and providing, to the display system, the portion of the virtual vehicle visible from the virtual position of the point of view consists of displaying the portion of the virtual vehicle visible within the field of view.

In some embodiments, the system may facilitate a competition between two virtual vehicles on a physical racecourse. In a scenario where two virtual vehicles compete on a physical racecourse without any physical vehicles, then the first sensor detecting a position of a physical vehicle would unnecessary. The system in such an embodiment could include a sensor detecting a position of a point of view at the racecourse and a display system providing a portion of the virtual vehicle visible from the position of the point of view at the racecourse. All aspects of the foregoing systems not concerning to the position of the physical vehicle could be applied in such embodiment. In some embodiments, the virtual vehicles are given special properties and a video game appearance. For example, cars can be given boosts, machine guns, missiles (other graphical virtual objects put into the real world view), virtual jumps, etc. In some embodiments, the physical vehicles can be given similar video game attributes. For example, graphic virtual objects such as machine guns or missiles etc. may be rendered and overlaid on the physical vehicles as observed on a display. Viewers at the racecourse and at home could view the virtual competitors on the physical racecourse as if competing in the real-world.

As used herein, "point of view" can be understood to be a real world position from which the virtual vehicle will be viewed. For example, an operator of a physical vehicle (e.g., a driver in the physical vehicle) viewing his surroundings. A display may be used to augmenting the operator's view by introducing the virtual vehicle in the view. Because the virtual vehicle is added to the real world point of view, if the display system was not provided or discontinued, the real world point of view would not see a virtual vehicle.

FIG. 1 is a diagram 100 of a physical vehicle 101, according to some embodiments. FIG. 1 provides an example of a point of view of an operator (e.g., driver) of physical vehicle 101. Thus, the position of the point of the view of the operator is the position and direction (gaze) of the operator's eyes (or some approximation of the operator's eye position and direction). Although FIG. 1 is provided with reference to the point of view of the operator of a physical vehicle, the teachings apply equally to other points of view, such as audience member at a racecourse on which physical vehicle is driving or a camera at the racecourse.

Physical vehicle 101 includes a display system 102 (including rendering component 107), a simulation component 106, a telemetry system 104 (including sensors 108), RF circuitry 105, and a force controller 112. Physical vehicle 101 also includes eye-position detector 110, front windshield 120, rear-view mirror 122, rear windshield 124, side windows 126A and 126B, side mirrors 128A and 128B, seat and head brace 130, speakers 132, and brakes 134. FIG. 1 also includes a vehicle operator 114. In FIG. 1, vehicle operator 114 is illustrated wearing a helmet 116, a visor over eyes 117, and a haptic suit 118. In some embodiments, the visor worn over eyes 117 is a component of helmet 116.

As shown in FIG. 1, physical vehicle 101 is an automobile. In some embodiments, devices within physical vehicle 101 communicate with a simulation system 140 to simulate one or more virtual vehicles within a field of view of vehicle operator 114. Simulation system 140 may be on-board physical vehicle 101. In some embodiments, as illustrated in diagram 100, simulation system 140 may be remote from physical vehicle 101, also described elsewhere herein. In some embodiments, the functionality performed by simulation system 140 may be distributed across both systems that are on-board physical vehicle 101 and remote from physical vehicle 101. In some embodiments, simulation system 140 generates and maintains a racing simulation 141 between one or more live participants (i.e., vehicle operator 114 operating physical vehicle 101) and one or more remote participants (not shown).

Simulating virtual vehicles in real-time enhances the racing experience of vehicle operator 114. Implementing simulation capabilities within physical vehicle 101 allows vehicle operator 114, who is a live participant, to compete against a remote participant operating a virtual vehicle within racing simulation 141. The field of view of vehicle operator 114 is the observable world seen by vehicle operator 114 augmented with a virtual vehicle. In some embodiments, the augmentation can be provided by a display, e.g., displays housed in or combined with one or more of front windshield 120, rear-view mirror 122, rear windshield 124, side windows 126A and 126B, and side mirrors 128A and 128B.

In some embodiments, the augmentation can be provided by a hologram device or 3-D display system. In these embodiments, front windshield 120, rear-view mirror 122, rear windshield 124, side windows 126A and 126B, or side mirrors 128A and 128B can be T-OLED displays that enable 3-D images to be displayed, utilizing cameras to capture the surroundings displayed with 3-D images overlaid on non-transparent displays.

In some embodiments, the augmentation can be provided by a head-mounted display (HMD) worn by vehicle operator 114 over eyes 117. The HMD may be worn as part of helmet 116. In some embodiments, the HMD is imbedded in visors, glasses, goggles, or other devices worn in front of the eyes of vehicle operator 114. Like the display described above, the HMD may operate to augment the field of view of vehicle operator 114 by rendering one or more virtual vehicles on one or more displays in the HMD.

In other embodiments, the HMD implements retinal projection techniques to simulate one or more virtual vehicles. For examples, the HMD may include a virtual retinal display (VRD) that projects images onto the left and right eyes of vehicle operator 114 to create a three-dimensional (3D) image of one or more virtual vehicles in the field of view of vehicle operator 114.

In some embodiments, the augmentation can be provided by one or more displays housed in physical vehicle 101 as described above (e.g., front windshield 120 and rear-view mirror 122), a display worn by vehicle operator 114 as described above (e.g., an HMD), a hologram device as described above, or a combination thereof. An advantage of simulating virtual vehicles on multiple types of displays (e.g., on a display housed in physical vehicle 101 and an HMD worn by vehicle operator 114) is that an augmented-reality experience can be maintained when vehicle operator 114 takes off his HMD. Additionally, multiple participants in physical vehicle 101 can share the augmented-reality experience regardless of whether each participant is wearing an HMD.

In some embodiments, multiple virtual vehicles are simulated for vehicle operator 114. For example, multiple virtual vehicles are displayed in front and/or behind and/or beside the operator. For example, one or more virtual vehicles may be displayed on front windshield 120 (an example display) and one or more virtual vehicles may be displayed on rear-view mirror 122 (an example display). In addition, one or more virtual vehicles may be displayed on the HMD. Similarly, physical vehicle 101 may be one of a plurality of physical vehicles in proximity to each other. In some embodiments, a virtual vehicle being simulated for vehicle operator 114 can be another physical vehicle running on a physical racecourse at a different physical location than that being run by vehicle operator 114. For example, one driver could operate a vehicle on a racecourse in Monaco and another driver could operate a vehicle on replica-racecourse in Los Angeles. Embodiments herein contemplate presenting one or both of the Monaco and Los Angeles driver with a virtual vehicle representing the other driver.

Returning to simulation system 140 and as described above, simulation system 140 may include racing simulation 141, which simulates a competition between physical vehicle 101 and one or more virtual vehicles on a virtual racecourse. In some embodiments, the virtual racecourse is generated and stored by simulation system 140 to correspond to the physical racecourse in which vehicle operator 114 is operating, e.g., driving, physical vehicle 101. In some embodiments, the virtual racecourse is generated using 360 degree laser scan video recording or similar technology. Therefore, as vehicle operator 114 controls physical vehicle 101 on the physical racecourse in real-time, the virtual trajectory of physical vehicle 101 within racing simulation 141 is simulated by simulation system 140 to emulate the physical, real-world trajectory of physical vehicle 101 on the physical racecourse.

In some embodiments, to enable simulation system 140 to simulate physical vehicle 101 on the virtual racecourse in racing simulation 141, physical vehicle 101 includes telemetry system 104. Telemetry system 104 includes sensors 108 that detect data associated with physical vehicle 101. Sensors 108 include one or more devices that detect kinematics information of physical vehicle 101. In some embodiments, kinematics information includes one or more vectors of motion, one or more scalars of motion, an orientation, a Global Positioning System (GPS) location, or a combination thereof. For example, a vector of motion may include a velocity, a position vector, or an acceleration. For example, a scalar of motion may include a speed. Accordingly, sensors 108 may include one or more accelerometers to detect acceleration, one or more GPS (or GLONASS or other global navigation system) receiver to detect the GPS location, one or more motion sensors, one or more orientation sensors, or a combination thereof. In some embodiments, the real-time data collected by sensors 108 are transmitted to simulation system 140. Other real-time data may include measurements of the car, heat, tire temperature, etc. In some embodiments, one or more of the kinematics information and car measurements are used for simulation predictability. For example, some embodiments may include predictive simulation engines that pre build scenes based on these other measurements and the velocity and acceleration information.

In some embodiments, physical vehicle 101 includes radio frequency (RF) circuitry 105 for transmitting data, e.g., telemetric information generated by telemetry system 104, to simulation system 140. RF circuitry 105 receives and sends RF signals, also called electromagnetic signals. RF circuitry 105 converts electrical signals to/from electromagnetic signals and communicates with communications networks and other communications devices via the electromagnetic signals. RF circuitry 105 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 105 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol.

In some embodiments, simulation system 140 includes RF circuitry, similar to RF circuitry 105, for receiving data from physical vehicle 101. Based on the telemetric information received from physical vehicle 101, simulation system 140 simulates physical vehicle 101 as an avatar within racing simulation 141. In some embodiments, as will be further described with respect to FIG. 5, simulation system 140 receives inputs for controlling and simulating one or more virtual vehicles within racing simulation. In some embodiments, simulation system 140 calculates kinematics information of the virtual vehicle based on the received inputs and a current state of the virtual vehicle on the virtual racecourse in racing simulation 141. For example, the current state may refer to a coordinate, a position, a speed, a velocity, an acceleration, an orientation, etc., of the virtual vehicle being simulated on the virtual racecourse. To replicate the virtual race between a live participant, i.e., vehicle operator 114, and a virtual participant operating a virtual vehicle for vehicle operator 114, simulation system 140 transmits kinematics information of the virtual vehicle to components (e.g., display system 102 or simulation component 106) in physical vehicle 101 via RF circuitry. As described elsewhere in this disclosure, it is to be understood that depending on the type of context being simulated, the display system 102 and other components shown in physical vehicle 101 may be housed in other types of devices.

In some embodiments, to enable two-way interactive racing where interactions simulated in racing simulation 141 can be reproduced for vehicle operator 114 driving physical vehicle 101, simulation system 140 determines whether the avatar of physical vehicle 101 within racing simulation 141 is in contact with obstacles, such as the virtual vehicle, being simulated within racing simulation 141. Upon determining a contact, simulation system 140 calculates force information, audio information, or a combination thereof associated with the contact. In some embodiments, simulation system 140 transmits the force or audio information to physical vehicle 101 where the force or audio information is reproduced at physical vehicle 101 to enhance the virtual reality racing experience for vehicle operator 114.

Returning to physical vehicle 101, physical vehicle 101 includes a display system 102 for generating a representation of a virtual vehicle based on information, e.g., kinematics information of the virtual vehicle, received from simulation system 140 via RF circuitry 105. In some embodiments, display system 102 is coupled to a simulation component 106 that generates a virtual representation of the virtual vehicle based on the kinematics information of the virtual vehicle received from simulation system 140. In some embodiments, simulation component 106 generates the virtual representation based on the kinematics information and eyes measurements (e.g., a spatial position) of the eyes 117 of vehicle operator 114. To further enhance the realism of the virtual representation, i.e., a graphically generated vehicle, simulation component 106 generates the virtual representation based on the kinematics information, a spatial position of eyes 117 of vehicle operator 114, a gaze direction of eyes 117, and a focus point of eyes 117, according to some embodiments. As described herein, eyes measurements may include a spatial position of eyes 117, a gaze direction of eyes 117, a focus point of eyes 117, or a combination thereof of the left eye, the right eye, or both left and right eyes.

In some embodiments, physical vehicle 101 includes eye-position detector 110, e.g., a camera or light (e.g., infrared) reflection detector, to detect eyes measurements (e.g., spatial position, gaze direction, focus point, or a combination thereof of eyes 117) of eyes 117 of vehicle operator 114. In some embodiments, eye-position detector 110 detects a spatial position of the head of vehicle operator 114 to estimate the measurements of eyes 117. For example, eye-position detector 110 may detect helmet 116 or a visor on helmet 116 to estimate the measurements of eyes 117. Detecting eye measurements and/or head position may also include detecting at least one of a position and an orientation of helmet 116 worn by vehicle operator 114.

The position of the eyes may be calculated directly (e.g., from a fixed sensor, such as a track-side sensor) or based on a combination of the sensor in the car and a position of the car.

In some embodiments, eye-position detector 110 includes a camera that can record a real-time video sequence or capture a series of images of the face of vehicle operator 114. Then, eye-position detector 110 may track and detect the measurements of eyes 117 by analyzing the real-time video sequence or the series of images. In some embodiments, eye-position detector 110 implements one or more algorithms for tracking a head movement or orientation of vehicle operator 114 to aid in eye tracking, detection, and measurement. As shown in diagram 100, eye-position detector 110 may be coupled to rear-view mirror 122. However, as long as eye-position detector 110 is implemented in proximity to physical vehicle, eye-position detector 110 can be placed in other locations, e.g., on the dashboard, inside or outside physical vehicle 101. In some embodiments, to increase accuracy in detection, eye-position detector 110 can be implemented within helmet 116 or other head-mounted displays (HMDs), e.g., visors or goggles, worn by vehicle operator 114 over eyes 117.

In some embodiments, eye-position detector 110 implemented within a HMD further includes one or more focus-tunable lenses, one or more mechanically actuated displays, and mobile gaze-tracking technology reproduced scenes can be drawn that actually correct common refractive errors in the VR world as the eyes are continually monitored based on where a user looks in a virtual scene. An advantage of the above techniques is that vehicle operator 114 would not need to wear contact lenses or corrective glasses while wearing a HMD implanting eye-position detector 110.

In some embodiments, simulation component 106 generates the virtual representation of the virtual vehicle based on a 3-D model of the virtual vehicle. For example, the virtual representation may represent a perspective of the 3-D model as viewed from eyes 117. In some embodiments, by generating the virtual representation from the perspective of eyes 117 whose measurements are detected or estimated by eye-position detector 110, the virtual representation can be simulated in accurate dimensions and scaling for vehicle operator 114 to increase the reality of racing against the virtual vehicle. In some embodiments, the 3-D model may be pre-stored on simulation component 106 or received from simulation system 140.

In some embodiments, rendering component 107 within display system 102 displays the generated virtual representation on one or more displays of physical vehicle 101. As discussed above, the virtual representation may be generated by simulation component 106 in some embodiments or simulation system 140 in some embodiments. The one or more displays may include windows of physical vehicle 101, e.g., front windshield 120 or side windows 126A-B, or mirrors of physical vehicle 101, e.g., rear-view mirror 122 or side mirrors 128A-B. In some embodiments, the one or more displays may be components in helmet 116. Helmet 116 may include a helmet, visors, glasses, or a goggle system worn by vehicle operator 114.

In some embodiments, one or more displays (e.g., front windshield 120) can be transparent organic light-emitting diode (T-OLED) displays that allow light to pass through the T-OLED to display the field of view to vehicle operator 114. In these embodiments, rendering component 107 renders the virtual representation of the virtual vehicle as a layer of pixels on the one or more displays. The T-OLED displays may allow vehicle operator 114 to see both the simulated virtual vehicle and the physical, un-simulated world in his field of view.

In other embodiments, one or more displays (e.g., front windshield 120) can be non-transparent liquid crystal displays (LCDs). In these embodiments, unlike the T-OLED displays, the LCD cannot allow light to pass through to enable vehicle operator 114 to see the physical, un-simulated world in his field of view. Instead, in these embodiments, a camera (e.g., a pinhole camera) facing outwards with respect to the LCD and coupled to physical vehicle 101 can record a live video feed of the physical, un-simulated world and representing the field of view of the physical world as would be seen from eyes 117 of vehicle operator 114 if the LCD were to be transparent (e.g., an T-OLED display). Then, rendering component 107 may display the live video feed on the interior side of the LCD to display the field of view to vehicle operator 114. Further, rendering component 107 may overlay the generated virtual representation on the live video feed being displayed by the LCD to enable vehicle operator 114 to see the simulated, virtual vehicle.

In some embodiments, the non-transparent LCD cannot by itself display images or live video feeds in 3D. Accordingly, the camera used to record the live video feed may include one or more cameras that are part of a stereoscopic camera system to record the physical world in color and in 3D. In some embodiments, to further enhance the 3D effect of the live video feed being displayed, the non-transparent LCD is a multi-view autostereoscopic 3D display, i.e., an automultiscopic display, that enables vehicle operator 114 to view the displayed 3D video feed from different angles as vehicle operator 114 moves his head and as a result, his eyes 117.

In high speed racing events, the head of vehicle operator 114 moves very little. Therefore, in some embodiments, eye-position detector 110 for tracking a position of the head or eyes 117 of vehicle operator 114 may be omitted from physical vehicle 101 to reduce a number of components and complexity in simulating virtual vehicles at physical vehicle 101. In some embodiments, to enable vehicle operator 114 to freely move his head, eye-position detector 110 is implemented to track a position of the head or eyes 117 of vehicle operator 114. In embodiments where the display is a non-transparent display, an angle of one or more cameras, e.g., cameras in a stereoscopic camera system, can be adjusted to correspond to the tracked position of the head or eyes 117 of vehicle operator 114.

In some embodiments, to enable two-way interactive racing where interactions simulated on the virtual racecourse in racing simulation 141 can be replicated for vehicle operator 114 driving physical vehicle 101, simulation component 106 determines a proximity of the virtual vehicle with physical vehicle 101 based on the kinematics information of the virtual vehicle received from simulation system 140. In some embodiments, upon determining a contact between the virtual vehicle and physical vehicle 101 based on the determined proximity, simulation system 140 calculates force information, audio information, or a combination thereof associated with the contact. Then, simulation component 106 may transmit the force information to force controller 112 and/or the audio information to speakers 132. In some embodiments, playing the audio information via speakers 132 may emulate the sound of the engine, brakes, tires, and collision between physical vehicle 101 and the virtual vehicle being simulated by simulation system 140. In some embodiments, the audio information may include a volume that is calculated based on a distance calculated between physical vehicle 101 and the virtual vehicle on the simulated racecourse, and may take into account the directional position of the head and orientation of the ears of vehicle operator 114. In some embodiments, speakers 132 may include audio devices equipped in physical vehicle 101 (e.g., a loudspeaker or speaker system) or audio devices worn by vehicle operator 114 (e.g., headphones or earpieces). In embodiments where speakers 132 are worn by vehicle operator 114, speakers 132 may be implemented within a head-mounted display such as helmet 116.

For sound reproduced for observers not in the physical vehicle (e.g., an audience member at a racecourse or watching at home), speakers can be placed around the track or through the headgear or audience member or point of view of camera. In the virtual world, microphone position can be set, just like with camera position. Similarly, sound generations positions can be set. In some embodiments, when the virtual car with a sound generation position is further from the microphone the noise it makes would be less.

In some embodiments, force controller 112 controls one or more actuators based on the force information to emulate the contact simulated between physical vehicle 101 and the virtual vehicle on the virtual racecourse simulated by simulation system 140. For example, force controller 112 may control one or more force actuators built into seat and head brace 130 to emulate how vehicle operator 114 would feel, e.g., a sensation of being bumped in the head, in a collision. Similarly, in some embodiments, force controller 112 may communicate via wired or wireless communications with a haptic suit 118 worn by vehicle operator 114 to emulate the sensation of vehicle operator 114 contacting a real physical vehicle. Force controller 112 may also control one or more force actuators built into the physical vehicle 101 to emulate the physical vehicle 101 making contact with a virtual object. In some embodiments, force controller 112 controls one or more mechanical systems that affect the actual functioning of physical vehicle 101. For example, force controller 112 may control one or more brakes 134, a steering column, or a power of physical vehicle 101 among other mechanical and/or electrical systems to emulate the effects of contact between physical vehicle 101 and the virtual vehicle or virtual object were the virtual object, such as a virtual vehicle, actually a physical object on the same racecourse as physical vehicle 101. As described above, in some embodiments, the virtual object being simulated can be a physical vehicle in the real world on a racecourse at a different physical location. Therefore, the present disclosure also enables two vehicle operators running on different racecourses to feel as if they are competing on the same racecourse since their counterpart physical vehicles can be simulated as virtual vehicles.

In some embodiments involving electric cars, emulating effects may include control over the power generated to the axels, and in some cases to each specific wheel in a car with four electric motors (one for each wheel). This may advantageously allow a bump to be simulated by a small spike down in the motor of the wheel. This can be controlled based on the duration of the impact and other factors.

Figure 5:
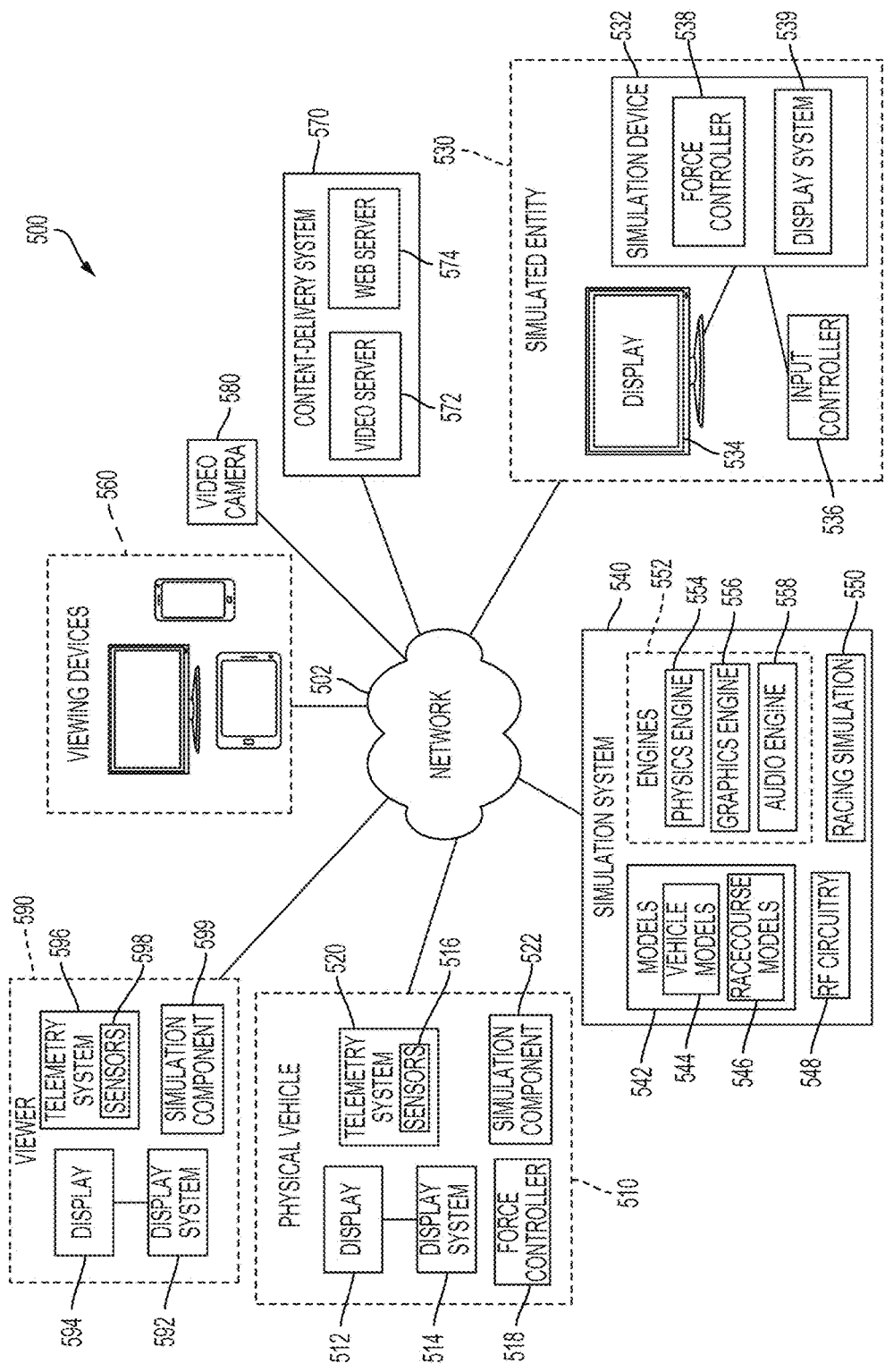
FIG. 5 is a system for simulating a virtual race between a live system and a simulated system, according to some embodiments.

In some embodiments, as described with respect to FIG. 5, some or all of the functionality of simulation component 106 described above may be performed remotely by, for example, simulation system 140. In these embodiments, display system 102 receives a virtual representation generated by simulation system 140. Relatedly, in these embodiments, force controller 112 and speakers 132 may receive force and audio information, respectively, that is calculated by simulation system 140.

Figure 2A:
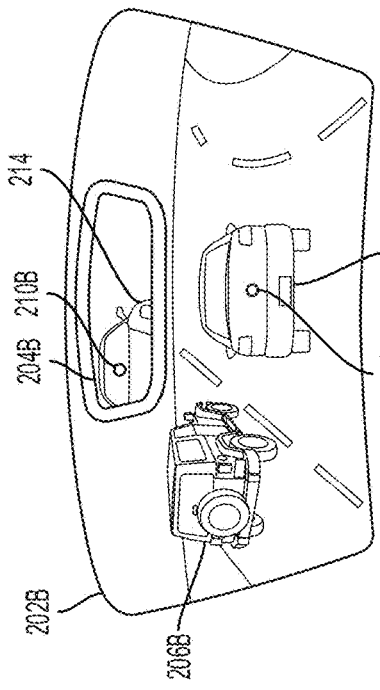
FIGS. 2A-C are diagrams showing how one or more virtual vehicles are displayed on one or more displays, according to some embodiments.
Figure 2C:
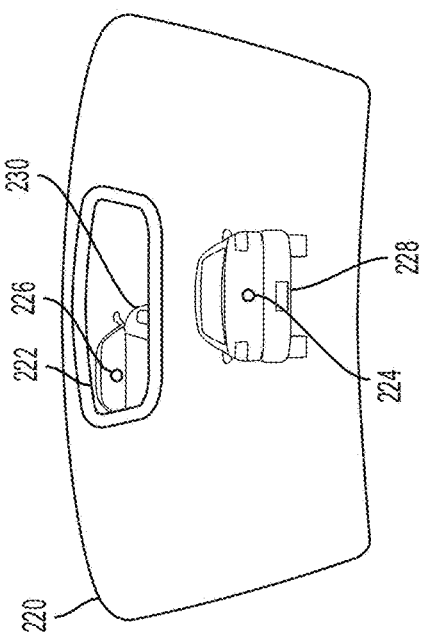
Figure 2B:
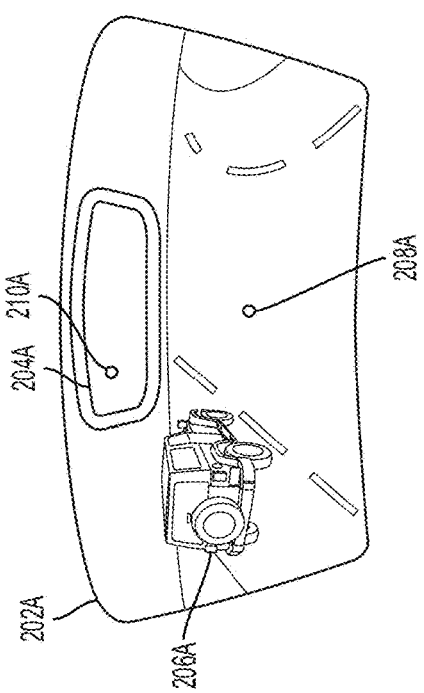

FIGS. 2A-C are diagrams showing how multiple virtual vehicles are displayed on one or more displays, respectively, according to some embodiments. For ease of explanation, FIGS. 2A-C will be described with respect to the elements, e.g., display system 102 and vehicle operator 114, of FIG. 1. According to some embodiments, the virtual vehicles can be displayed according to an augmented reality embodiment or a full-rendering embodiment, each of which will be further described below.

In the augmented reality embodiment, view 202A and 204A of FIG. 2A can be augmented with virtual vehicles 228 and 230 being output on respective displays 220 and 222 of FIG. 2C to enable vehicle operator 114 to see portions of virtual vehicles 212 and 214 shown in respective views 202B and 204B of FIG. 2B. In some embodiments, display 220 and display 222 may correspond to front windshield 120 and rear-view mirror 122 as described with respect to FIG. 1

As shown in FIG. 2A, view 202A shows the field of view of vehicle operator 114 who may see, via displays 220 and 222, a physical vehicle 206A on the physical racecourse. Similarly, view 204A shows empty space as there are no real vehicles on the physical racecourse viewable by vehicle operator 114 via display 222.

In some embodiments, to simulate one or more virtual vehicles for display on display 220 and 222, display system 102 identifies one or more positions 224 and 226 on displays 220 and 222, respectively. In some embodiments, position 224 may correspond to a physical position 208A in the field of view of vehicle operator 114. For example, position 224 on display 220 may correspond to a portion of the physical racecourse or a portion of a building or landmark viewable by vehicle operator 114 (shown as position 208A in view 202A) and simulated in the virtual racecourse within racing simulation 141 of simulation system 140. Similarly, position 26 may correspond to a different portion of the physical racecourse or a portion of a building or landmark viewable by vehicle operator 114 (shown as position 210A in view 202A).

In some embodiments, as described with respect to FIG. 1, simulation component 106 may generate a first virtual vehicle 228 as a first representation and a second virtual vehicle 230 as a second representation. In some embodiments, simulation component 106 may generate the first virtual vehicle 228 based on position 224, measurements of eyes 117 (as described with respect to eye-position detector 110), and the kinematics of the first virtual, competitor vehicle. As shown in display 220, rendering component 107 displays first virtual vehicle 228 to align with position 224. Similarly, rendering component 107 may display second virtual vehicle 230 to align with position 226 on display 222.

As a result, vehicle operator 114 may see physical objects and virtual objects as shown in views 202B and 204B. For example, similar to view 202A, view 202B shows that vehicle operator 114 may continue to see physical vehicle 206B. However, view 202B shows that vehicle operator 114 may see virtual objects such as virtual vehicle 212 displayed as virtual vehicle 228 on display 220. Similarly, view 204B shows that vehicle operator 114 may see virtual objects such as virtual vehicle 214 displayed as virtual vehicle 230 on display 222. Further embodiments are described with respect to FIG. 10.

In the full rendering embodiment, displays 220 and 222 can be configured to render both physical and virtual objects for display to enable vehicle operator 114 to see virtual vehicles alongside physical vehicles. In this embodiment, rendering component 107 can render and display physical objects such as roads and physical vehicle 206A as shown in views 202A and 204A of FIG. 2A. As described above with respect to the augmented reality embodiment, simulation component 106 may generate a first virtual vehicle 228 as a first representation and a second virtual vehicle 230 as a second representation for display. In the full rendering embodiment, displays 220 and 222 can be configured to display virtual vehicles 228 and 230, respectively, alongside physical objects as shown in views 202B and 204B seen by vehicle operator 114. For example, view 202B shows the road, physical vehicle 206B, and virtual vehicle 212 being rendered and displayed. Similarly, view 204B shows virtual vehicle 214 being rendered and displayed. In some embodiments, in the full rendering embodiment, an outward facing camera (with respect to displays 220 and/or 222) can capture a live video feed of the surroundings. In these embodiments, displays 220 and 222 can be configured to display the physical objects by displaying each frame of the live video feed. Further, displays 220 and 222 can be configured to display virtual objects by overlaying virtual vehicles onto each displayed frame.

FIGS. 3A-D are diagrams showing how visible portions of virtual vehicle 322 and visible portions of virtual vehicle 324 are displayed on a display 320, according to some embodiments. For ease of explanation, diagram 300 will be described with respect to the elements, (e.g., display system 102, vehicle operator 114, and simulation system 140) of FIG. 1. FIG. 3A shows an example real-world view 302A that may be observed by vehicle operator 114 through conventional displays. FIG. 3B shows an example virtual rendering 332 of real-world view 302A to include virtual vehicles 343 and 344. FIG. 3C shows an example of display 320 for displaying visible portions 322 and 324 of virtual vehicles 343 and 344, respectively. Display 320 may correspond to a display implemented within a visor, a helmet (e.g., helmet 116), or other headgear worn by an operator (e.g., vehicle operator 114) sitting within and driving a physical vehicle (e.g., physical vehicle 101). FIG. 3D shows an example augmented view 302B that may be observed by vehicle operator 114 through display 320.

As shown in FIG. 3A, real-world view 302A shows the field of view of vehicle operator 114 if virtual vehicles were not displayed, i.e., via conventional displays. As shown in real-world view 302A, vehicle operator 114 may see, through display 320, other physical vehicles such as physical vehicle 310A on a physical racecourse as well as physical objects within physical vehicle 101. For example, such physical objects may include, without limitation, rearview mirror 304A, vehicle frame 306A, windshield wipers 308A, dashboard 312A, etc. In some embodiments, physical objects may include the hands or arms of vehicle operator 114. Additionally, as shown in real-world view 302A, vehicle operator 114 may see a shadow of physical vehicle 310A. In some embodiments, vehicle operator 114 may see physical vehicles and physical objects through display 320 because display 320 can be a transparent or semi-transparent display.

As discussed above with respect to FIG. 1, kinematics information of physical vehicle 101 (e.g., position information) and a position of the operator's point of view may be transmitted to simulation system 140 configured to provide visible portions of virtual vehicles 313 and 314. In some embodiments, based on the kinematics information and the position of the operator's point of view, simulation system 140 can calculate a virtual world to include virtual vehicles and a representation of physical vehicle 101 racing against each other on a virtual racecourse corresponding to the physical racecourse seen by operator 114. In some embodiments, simulation system 140 can calculate representations of the various physical objects within the virtual world.

In some embodiments, to enable simulation system 140 to track and calculate representations of the hands or arms of vehicle operator 114, vehicle operator 114 can wear gloves that embed one or more sensors (e.g., accelerometers, position sensors, etc.) that transmit position-related measurements to simulation system 140. Based on sensor measurements, e.g., position or acceleration information, simulation system 140 can calculate corresponding representations of arms or hands (not shown) in the virtual world.

In some embodiments, to enable simulation system 140 to track and calculate representations of the hands or arms of vehicle operator 114, one or more cameras can be mounted in the physical vehicle being operated by vehicle operator 114. The one or more cameras may track positions of the arms and hands based on markers embedded in or displayed on gloves or tracksuit worn by vehicle operator 114. For example, markers may include specific colors, patterns, materials, etc. In these embodiments, the one or more camera may transmit the captured information to simulation system 140 that calculates the corresponding representations of arms or hands (not shown) in the virtual world.

As shown in FIG. 3B, simulation system 140 may calculate, within the virtual world, a virtual rendering 332 of real-world view 302A. In virtual rendering 332, simulation system 140 can calculate a representation 340 of physical vehicle 310A and virtual vehicles 343 and 344. Additionally, simulation system 140 can calculate representations 334, 336, 338, and 342 of corresponding physical objects: rearview mirror 304A, vehicle frame 306A, windshield wipers 308A, and dashboard 312A. As shown in virtual rendering 332, simulation system 140 can exclude calculating representations of physical objects that do not obstruct view of virtual vehicles 343 and 344. For example, the speedometer and steering wheel as seen by vehicle operator 114 in real-world view 302A may not be calculated by simulation system 140 in virtual rending 332. In some embodiments, as shown in virtual rendering 332, simulation system 140 can calculate shadows of physical vehicle 340 and virtual vehicles 343 and 344.

In some embodiments, simulation system 140 can calculate portions of virtual vehicles 322 and 324 to display on display 320 of FIG. 3C to enable vehicle operator 114 to compete against virtual drivers in the real world. In some embodiments, a visible portion of a virtual vehicle from the position of the point of view of vehicle operator 114 is that portion of the virtual vehicle that is not obstructed by objects in the virtual world from a virtual position in the virtual world corresponding to the position of the point of view in physical vehicle 101. In some embodiments, the simulation system can convert the position of the point of view of vehicle operator 114 to virtual coordinates within the virtual world. For example, from the point of view of an operator of the physical vehicle, the corresponding virtual position in the virtual world would be inside a representation of physical vehicle 101 in the virtual world. From the corresponding virtual position of the point of view of physical operator 114 in the virtual world, a view of the virtual vehicle may be obstructed by the simulated physical vehicle (for example, representations of vehicle frame 306A or windshield wipers 308A), other simulated physical vehicles (e.g., a representation of physical vehicle 310A), shadows, simulated trees and other stationary objects, the simulated racecourse (e.g., when the virtual vehicle is in a dip and partially obstructed by the course itself, etc.) The visible portion of the virtual vehicle is then the unobstructed view of the virtual vehicle. Further embodiments are described with respect to FIGS. 6 and 9.

For example, as shown in virtual rendering 332 in FIG. 3B, the simulated view of virtual vehicle 343 shows that portions of virtual vehicle 343 are obstructed by a representation 336 of vehicle frame 306A. Similarly, in virtual rendering 332, the simulated view of virtual vehicle 343 shows that portions of virtual vehicle 344 are obstructed by a representation 340 of physical vehicle 310A and a representation 338 of windshield wiper 308A.

In some embodiments, simulation system 140 may calculate visible portions of a virtual vehicle 322 to be portions of virtual vehicle 343 in virtual rendering 332 that are not obscured by a representation of car frame 336 in the virtual world. Similarly, simulation system 140 may calculate visible portions of a virtual vehicle 324 to be portions of virtual vehicle 344 in virtual rendering 332 that are not obscured by representations 340 and 338 of physical vehicle 310A and windshield wiper 308A, respectively. In some embodiments, information related to these calculated visible portions 322 and 324 can be transmitted to components within physical vehicle 101 and displayed by display 320.

In some embodiments, as shown in FIG. 3C, components within physical vehicle 101, such as display system 102, can display visible portions 322 and 324 of virtual vehicles 343 and 344, respectively, on display 320. In some embodiments, visible portions 322 and 324 can include shadows of virtual vehicles 343 and 344 as calculated and shown in virtual rendering 332 of FIG. 3B. In some embodiments, by augmenting real-world view 302A with visible portions 322 and 324 being displayed on display 320, display system 102 enables vehicle operator 114 to see both physical vehicles in the real world and virtual vehicles.

In some embodiments, augmented view 302B in FIG. 3D shows the field of view of vehicle operator 114 once display 320 displays (e.g., as rendered by display system 102) visible portions of virtual vehicles 322 and 324. For example, similar to view 302A, vehicle operator 114 may still see, via display 320, various physical objects on the racecourse in the real world. For example, as shown in augmented view 302B, vehicle operator 114 may still see rearview mirror 304B, vehicle frame 306B, windshield wiper 308B, physical vehicle 310B, and dashboard 312B. Additionally, vehicle operator 114 may see virtual vehicles 313 and 314 being displayed. In some embodiments, virtual vehicles 313 and 314 seen by vehicle operator 114 respectively correspond to visible portions of virtual vehicles 322 and 324 being displayed on display 320, as described above. In some embodiments, the techniques described with respect to FIGS. 2A-C can be combined with the techniques described with respect to FIGS. 3A-D.

Figure 4A:
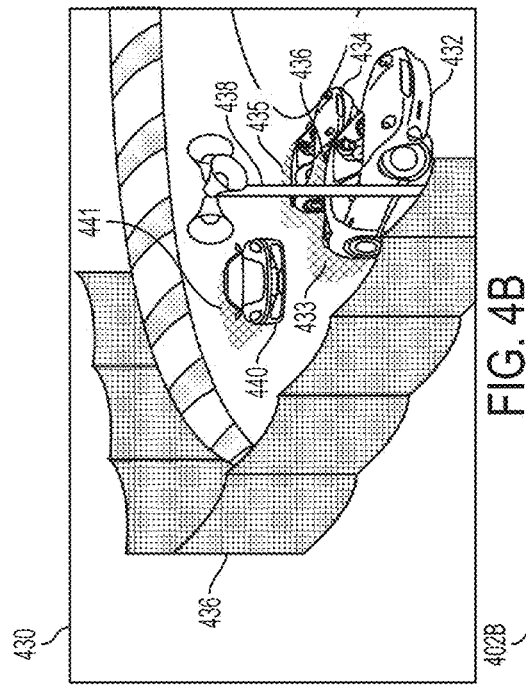
FIGS. 4A-D are diagrams showing how visible portions of virtual vehicles are displayed on a display, according to some embodiments.
Figure 4B:
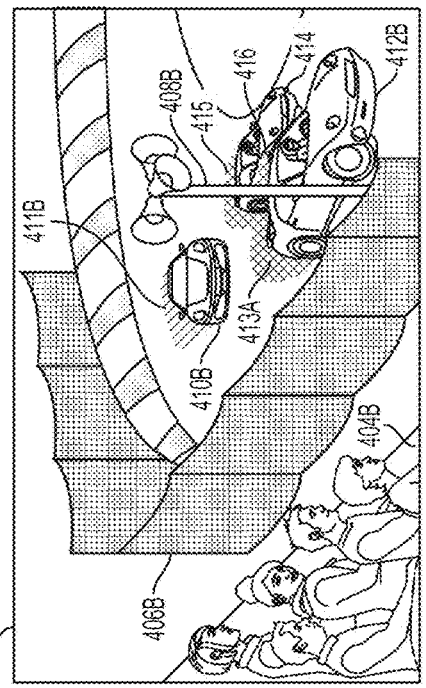
Figure 4C:
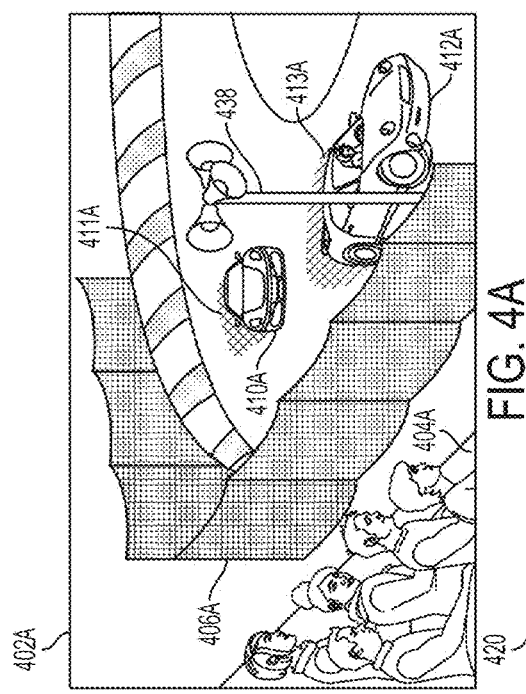
Figure 4D:
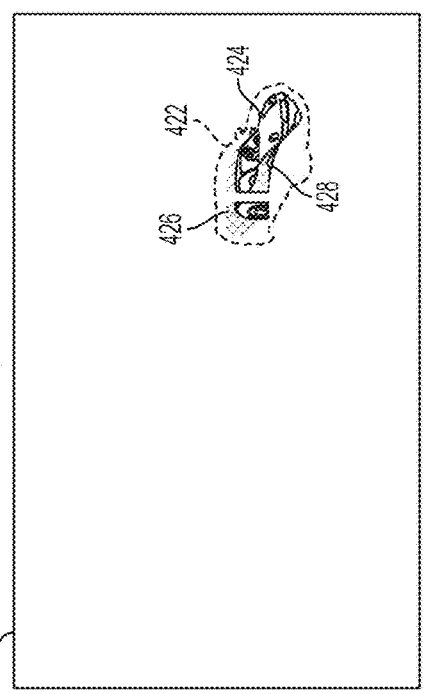

FIGS. 4A-D are diagrams showing how visible portions of virtual vehicle 422 are displayed on a display 420, according to some embodiments. FIG. 4A shows an example real-world view 402A that may be observed by a spectator or imaged by a video camera. FIG. 4B shows an example virtual rendering 430 of real-world view 402A to include virtual vehicle 434. FIG. 4C shows an example of display 420 for displaying visible portions 422 of virtual vehicle 434. Display 420 may correspond to a display implemented within a visor, a helmet (e.g., helmet 116), or other headgear worn by a viewer (e.g., an audience member) present at a physical racecourse. FIG. 4D shows an example augmented view 402B that may be observed by an audience member or imaged by a video camera through display 420.

As shown in FIG. 4A, real-world view 402A shows the field of view of the viewer if virtual vehicles were not displayed, i.e., via conventional displays. As shown in real-world view 402A, the viewer may see, via display 420, other viewers 404A and various physical objects in the real world. For example, such physical objects may include fence 406A, public announcement (PA) horn speakers 408A, and physical vehicles 410A and 412A, and shadows 411A and 413A of respective physical vehicles 410A and 412A. In some embodiments, the viewer may see physical vehicles and physical objects through display 420 because display 420 can be a transparent or semi-transparent display.

In some embodiments, in addition to fixed objects like fences or walls, the physical objects discussed above that may obstruct the viewer's field of view of the racecourse can include non-stationary objects whose positions may change over time. For example, such non-stationary objects may include the heads of audience members or the bodies of audience members when they stand. In some embodiments, to enable simulation system 140 to accurately calculate representations of both fixed and non-stationary objects, the viewer's headset can include a camera facing the racecourse and capturing a portion of the racecourse. The lines and borders of the racecourse or other markers placed on the racecourse can be detected by the camera to determine whether one or more physical objects are obstructing the viewer's view of the racecourse. For example, the camera can detect omitted portions or breaks in the edges, lines, or markers of the racecourse. In some embodiments, information about the breaks or omitted portions can be transmitted to simulation system 140. In some embodiments, simulation system 140 can determine which portions of the virtual vehicle are obstructed by physical objects by determining an overlapping portion of the virtual vehicle with the one or more breaks. Since a break indicates that the viewer's view is being blocked by a physical object, the simulation system 140 can set the alpha values of pixels in the overlapping portion to "zero percent" (in RGBA) to make these overlapping portions transparent.

In some embodiments, information related to the viewer's point of view may be transmitted to a simulation system (e.g., simulation system 140 or simulation system 540 of FIG. 5) configured to provide visible portions of virtual vehicle 422 to the viewer. For example, such information may include a position of the viewer's point of view. As described with respect to FIG. 6, the simulation system can calculate a virtual world to include virtual vehicles and representations of physical vehicles racing against each other on a virtual racecourse. In some embodiments, simulation system 140 can calculate representations of the various physical objects (e.g., PA speakers 408A) within the virtual world.

As shown in FIG. 4B, the simulation system may calculate, within the virtual world, a virtual rendering 430 of real-world view 402A. In virtual rendering 430, the simulation system can calculate virtual vehicle 434 and representations 440 and 432 of physical vehicles 410A and 412A. In some embodiments, virtual vehicle 434 as calculated by the simulation system can include a calculated shadow 435. Similarly, representations 440 and 432 of physical vehicles 410A and 412A can be calculated to include respective shadows 441 and 433. In some embodiments, the simulation system calculates shadows 441 and 433 in the virtual world to correspond to respective shadows 411A and 413A as seen by the viewer in real-world view 402A. Additionally, the simulation system can calculate representations 436 and 438 of corresponding physical objects: fence 406A and PA speakers 408A. As shown in virtual rendering 430, the simulation system can exclude calculating representations of physical objects that do not obstruct view of virtual vehicle 422. For example, audience (e.g., viewers 404A) in real-world view 402A may not be calculated by the simulation system in virtual rending 430.

In some embodiments, the simulation system can calculate portions of virtual vehicle 422 to display on display 420 of FIG. 4C to enable the viewer to see a race between physical vehicles 410A and 412A and virtual vehicles such as virtual vehicle 434 being simulated in the virtual world. In some embodiments, a visible portion of a virtual vehicle from the position of the viewer's point of view is that portion of the virtual vehicle that is not obstructed by objects in the virtual world from a virtual position in the virtual world corresponding to the position of the viewer's point of view. In some embodiments, the simulation system can convert the position of the viewer's point of view to virtual coordinates within the virtual world. From the corresponding virtual position of the viewer's point of view in the virtual world, a view of the virtual vehicle may be obstructed by simulated physical vehicles (for example, representations of physical vehicles 410A and 412A) and other simulated objects (e.g., representations of fence 406A and horn speakers 408A), simulated trees, the simulated racecourse (e.g., when the virtual vehicle is in a dip and partially obstructed by the course itself, etc.). The visible portion of the virtual vehicle is then the unobstructed view of the virtual vehicle. Further embodiments are described with respect to FIGS. 6 and 9.

For example, as shown in virtual rendering 432 in FIG. 4B, the simulated view of virtual vehicle 434 shows that portions of virtual vehicle 434 are obstructed by a representation 438 of PA speaker 408A and a representation 432 of physical vehicle 412A.

In some embodiments, the simulation system may calculate visible portions of virtual vehicle 422 to be portions of virtual vehicle 434 that are not obscured by representation of PA horn speakers 438 in virtual rendering 430 and that are not obscured by representation of physical vehicle 432 in the virtual world. In some embodiments, information related to the calculated visible portions 422 can be transmitted to the viewer and displayed by display 420.

In some embodiments, as shown in FIG. 4C, components worn by the viewer, such as display system 592 of FIG. 5, can display visible portions 422 of virtual vehicle 434 on display 420. As shown in FIG. 4C, visible portions 422 can include car frame and details 424 and a shadow 426 of virtual vehicle 434. In some embodiments, visible portions 422 can include a shadow 428 being cast on virtual vehicle 434 as calculated in virtual rendering 430. For example, shadow 428 may be a shadow cast by representation 432 of physical vehicle 412A being calculated in virtual rendering 430. In some embodiments, by augmenting real-world view 402A with visible portion 422 being displayed on display 420, a display system (e.g., display system 592) enables the viewer to see both physical vehicles in the real world and virtual vehicles.

In some embodiments, augmented view 402B in FIG. 4D shows the field of view of the viewer once display 420 displays (e.g., as rendered by display system 592) visible portions of virtual vehicle 422. For example, similar to view 402A, the viewer may still see, via display 420, various physical objects on the racecourse in the real world. For example, as shown in augmented view 402B, the viewer may still see other viewers 404B, fence 406B, public announcement (PA) horn speakers 408B, and physical vehicles 410B and 412B as well as their respective shadows 411B and 413B. Additionally, the viewer may see virtual vehicle 414 and shadow 415 of virtual vehicle 414 being displayed. In some embodiments, virtual vehicle 414 seen by the viewer can correspond to visible portions of virtual vehicle 422 being displayed on display 420, as described above. In the example of augmented view 402B, virtual vehicle 414 seen by the viewer is obstructed by PA horn speakers 408B and physical vehicle 412B. In some embodiments, virtual vehicle 414 being displayed can overlap portions of shadow 413A as may be seen by the viewer in real-world view 402A. As a result and as shown by shadow 413B in augmented view 402B, portions of shadow 413A may be obscured by visible portions of virtual vehicle 422. In some embodiments, visible portions of virtual vehicle 422 can include shadow 428 of physical vehicle 412A. In these embodiments and as shown in augmented view 402B, the viewer can see shadow 416 being cast on virtual vehicle 414.

In some embodiments, augmented view 402B can be provided to viewer via a non-transparent display based on a full rendering technique as described with respect to FIGS. 2A-C. In these embodiments, a camera coupled to a viewer's headset can capture one or more video frames of the viewer's field of view as seen in real-world view 402A. The simulation system can similarly calculate virtual vehicle 434 within virtual rendering 430. However, in these embodiments, instead of displaying only visible portions of virtual vehicle 422 on display 420, a display implemented in the viewer's headset can be configured to output the one or more captured video frames with visible portions of virtual vehicle 422 overlaid thereon. In some embodiments, physical objects (e.g., fences, beams, infrastructure, etc.) may block the viewer's view of the racecourse. Because augmented view 402B may be fully rendered views, the display may overlay both visible vehicles and representations of physical vehicles (as calculated by the simulation system) on top of the captured video frames such that large physical objects do not block the viewer's view of the race for extended periods of time.

Figure 6:
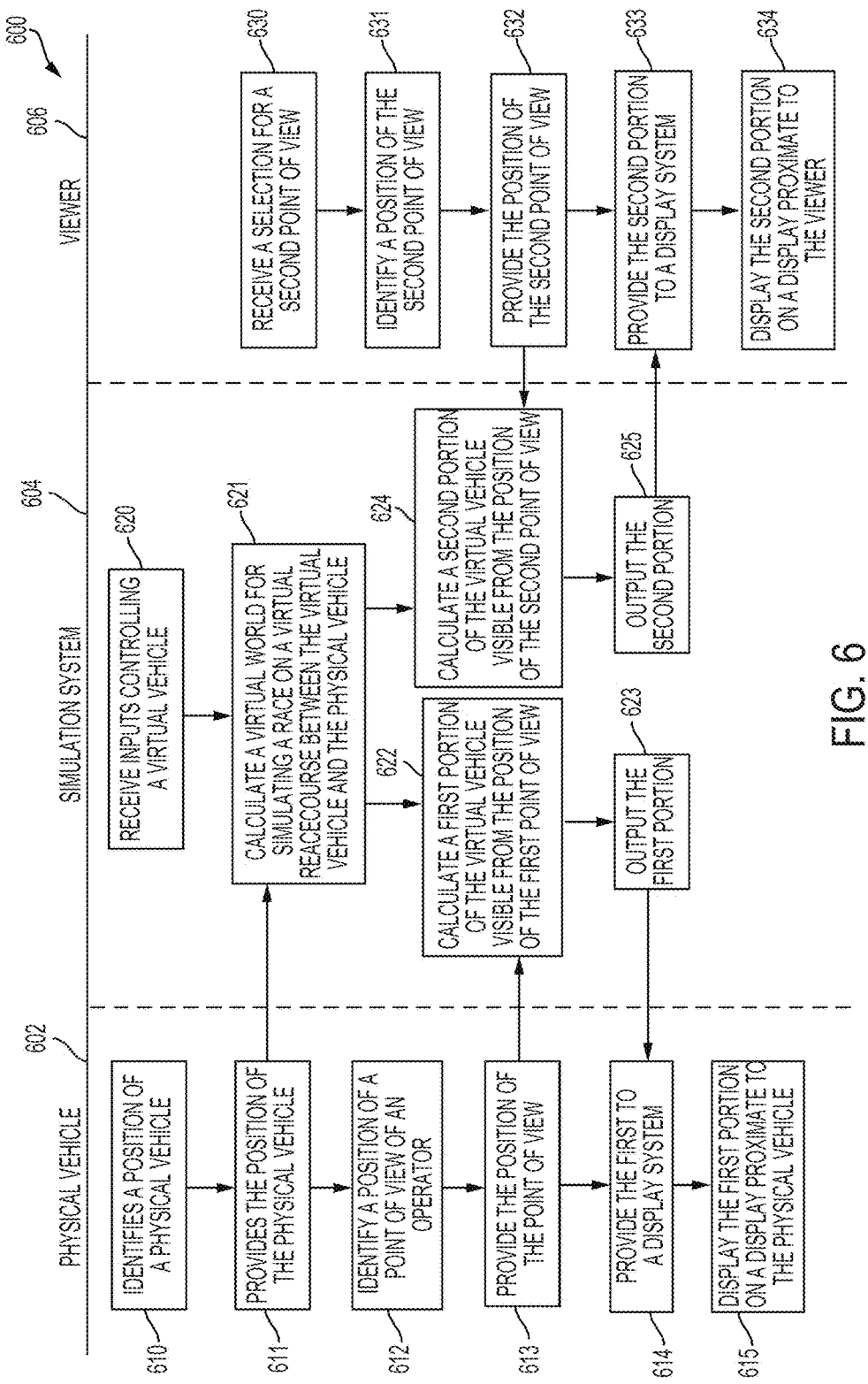
FIG. 6 is a flowchart illustrating a method for displaying virtual vehicles on displays, according to some embodiments.
Figure 9:
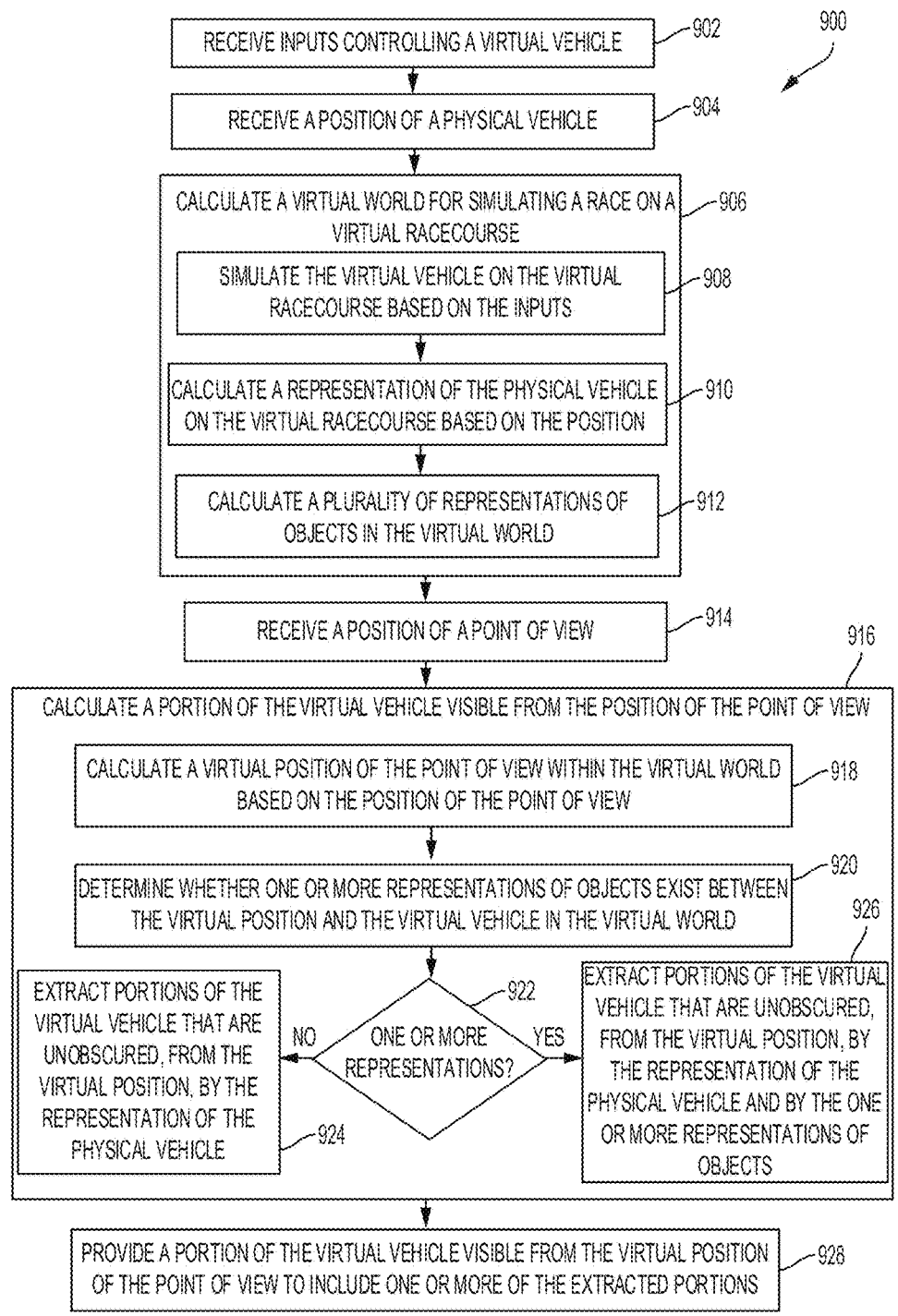
FIG. 9 is a flowchart illustrating a method performed by a simulation system to enable display of virtual vehicles, according to some embodiments.

In some embodiments, as will be further described with respect to FIGS. 5, 6, and 9, real-world view 402A may correspond to a live video feed captured by a camera (e.g., video camera 580 of FIG. 5) installed at a physical racecourse. In these embodiments, information related to a point of view of the camera may be transmitted to the simulation system. For example, such information may include one or more of the camera's position, orientation, tilt, or degree of rotation. Based on the information of the camera's point of view, the simulation system may calculate a virtual world to include virtual rendering 430 to include virtual vehicle, representations of physical vehicles, and representations of physical objects, as described with respect to FIG. 4B. In some embodiments, based on virtual rendering 430, the simulation system can calculate visible portions of virtual vehicle 422 as would be viewable at the position of the camera's point of view. As described with respect to FIG. 4C, visible portions of virtual vehicle 422 may include car frame and details 424, shadow 426 of the virtual vehicle, or shadow 428 being cast by other objects in virtual rendering 430. In some embodiments, visible portions of virtual vehicle 422 may be overlaid on the live video feed of real-world view 402A to display a race between physical vehicles and virtual vehicles, as shown in augmented view 402B and as described above with respect to FIG. 4D.

FIG. 5 is a system 500 for simulating a virtual race between a physical vehicle 510 and a simulated entity 530, according to some embodiments. In some embodiments, a network 502 communicatively couples various components: physical vehicle 510, simulated entity 530, simulation system 540, viewing devices 560, content-delivery system 570, camera 580, and viewer 590. In some embodiments, camera 580 can be coupled to content-delivery system 570. As shown in system 500, network 502 may be a conduit for data flows between the various components. Network 502 can be a wired and/or wireless network that includes any combination of local area networks (LANs), wide area networks (WANs), the Internet, and the like.

In some embodiments, simulation system 540 include a number of engines 552 that operate on models 542 and information received from physical vehicle 510 and simulated entity 530 to simulate the virtual race, represented as racing simulation 550. Further, simulation system 540 includes RF circuitry 548, which may include similar components as RF circuitry 105 described with respect to FIG. 1, for communicating data (e.g., graphics data, kinematics information, force information, audio information, etc.) with physical vehicle 510, viewer 590, and simulated entity 530.

In some embodiments, models 542 include vehicle models 544 and racecourse models 546. Vehicle models 544 may include 3-D models of animate or inanimate objects in the virtual environment of racing simulation 550. For example, vehicle models 544 may include a 3-D model of physical vehicle 510 as well as a 3-D model of a virtual vehicle corresponding to simulated entity 530. Racecourse models 546 may include 2-D or 3-D models of the physical racecourse on which physical vehicle 510 is operating. In some embodiment, the 2-D or 3-D models may include information related to terrains, boundaries, or topological features and the like. Racecourse models 546 may include a racecourse and related characteristics (e.g., terrain, material type, length, etc.), stands for an audience, etc.

In some embodiments, to generate and maintain racing simulation 550, engines 552 include a physics engine 554, a graphics engine 556, and an audio engine 558. Physics engine 554 may include algorithms for emulating the laws of physics realistically within racing simulation 550. In particular, physics engine 554 includes algorithms to control how components, e.g., simulated physical vehicles or simulated virtual vehicles, interact with each other and a virtual racecourse in racing simulation 550. In some embodiments, as described elsewhere herein, physics engine 554 generates and maintains racing simulation 550 based on kinematics information received from physical vehicle 510 and based on inputs received from simulated entity 530. As will be further described with respect to FIGS. 6 and 9, the kinematics information can include position information of physical vehicle 510, according to some embodiments. For example, physics engine 554 may generate an avatar of physical vehicle 510 within racing simulation 550 based on a corresponding model in vehicle models 544 where a position of the avatar in racing simulation 550 may be calculated based on the received kinematics information. Additionally, physics engine 554 may generate kinematics information of a virtual vehicle corresponding to simulated entity 530 based on the inputs received from simulated entity 530. Using the generated kinematics information and vehicle models 544, physics engine 554 may simulate the virtual vehicle on the virtual racecourse within racing simulation 550.

In some embodiments, to enable physical vehicle 510 to simulate one or more virtual vehicles on display 512, simulation system 540 transmits the kinematics information of the virtual vehicle to simulation component 522 or display system 514.

In some embodiments, as described with respect to simulation system 140 of FIG. 1, physics engine 554 (within simulation system 540) further calculates force information based on an interaction simulated between the physical vehicle and the virtual vehicle in racing simulation 550. In some embodiments, physics engine 554 calculates force information for physical vehicle 510 and force information for simulated entity 530. Then, simulation system 540 may transmit the calculated force information to physical vehicle 510, simulated entity 530, or both via RF circuitry 548.

In some embodiments, to enhance the realism of the race experienced at physical vehicle 510 and simulated entity 530, audio engine 558 (within simulation system) include algorithms for calculating sounds within racing simulation 550. Audio engine 558 may include sound files related to engines, brakes, tires, explosions, as well as collisions between vehicles. In some embodiments, audio engine 558 calculates a volume of a generated sound based on a distance between vehicles as calculated by physics engine 554 to generate racing simulation 550. Then, audio engine 558 may transmit audio information to physical vehicle 510, simulated entity 530, or both.

In some embodiments, graphics engine 556 generates 3-D animated graphics for racing simulation 550. For example, graphics engine 556 may utilize specialized hardware for rendering vehicles (e.g., an avatar of physical vehicle 510 or a virtual vehicle corresponding to simulated entity 530) based on vehicle models 544 and computations from physics engine 554. Further, graphics engine 556 may render a virtual racecourse within racing simulation 550 based on racecourse models 546. In some embodiments, the graphics information (e.g., vehicles and racecourse) generated by graphics engine 556 can be transmitted to physical vehicle 510, simulated entity 530, or a combination thereof via RF circuitry 548.

Graphics engine 556 may utilize techniques such as rasterization or ray-tracing for generating the 3-D animated graphics. In some embodiments, graphics engine 556 includes computer software applications that are programmed and compiled to be executed on one or more processors of simulation system 540. In other embodiments, graphics engine 556 can be built upon graphics application programming interfaces (APIs) such as Direct3D or Open GL.

In some embodiments, physical vehicle 510 corresponds to physical vehicle 101 described with respect to FIG. 1. To simulate a virtual vehicle, corresponding to simulated entity 530, at physical vehicle 510, physical vehicle 510 includes one or more of the following components: display 512, display system 514, telemetry system 520 (which may include sensors 516), force controller 518, and simulation component 522. These components may correspond to the similarly named components described with respect to FIG. 1. In general, telemetry system 520 can be two-way telemetry systems that receive and transmit data. For example, telemetry system 520 may transmit data, e.g., kinematics information of physical vehicle 510, monitored by sensors 516 to simulation system 540 via network 502. In some embodiments, the data includes a position of physical vehicle 510 on a physical racecourse. In some embodiments, the data captured by sensors 516 may include a position of a point of view of an operator of physical vehicle 510, as will be further described with respect to FIGS. 6 and 9.

In some embodiments, telemetry system 520 can receive kinematics information of the virtual vehicle from simulation system 540 as described above. Telemetry system 520 may route the received kinematics information to display system 514. Based on the received kinematics information, display system 514 may generate a virtual representation of the virtual vehicle that is processed by display system 514 for display on display 512. By simulating the virtual vehicle within a field of view of the operator of physical vehicle 510, system 500 enables the operator to feel as if the simulated vehicle is in physical proximity to the operator. As described above, the processing for generating the virtual representation of the virtual vehicle may be performed remotely, e.g., offloaded to simulation system 540. In these embodiments, the virtual representation can be generated and transmitted by simulation system 540 to display system 514. Display system 514 may then display the virtual representation on display 512 to simulate the virtual vehicle within the field of view of the operator.

In some embodiments, as will be further described with respect to FIGS. 6 and 9, to enhance the realism of the virtual representation, the generated virtual representation can include a portion of the virtual vehicle that is visible from the position of the point of view of the operator. In some embodiments, simulation system 540 can generate the visible portion. In some embodiments, simulation component 522 onboard physical vehicle 510 can generate the visible portion.

In some embodiments, to further enhance the realism of the race as experienced by the operator of physical vehicle 510, force controller 518 receives force information to control one or more mechanical elements in physical vehicle 510. In some embodiments, as described above, the force information as calculated by physics engine 554 is received from simulation system 540. In other embodiments, the force calculation may be performed on-board physical vehicle 510.

In some embodiments, viewer 590 may correspond to an audience member watching the race between physical vehicle 510 and simulated entity 530. To simulate a virtual vehicle for display to viewer 590, viewer 590 may wear or operate one or more devices that implement one or more of the following components: display 594, display system 592, telemetry system 596 (which may include sensors 598), and simulation component 599. These components may correspond to the similarly named components described with respect to physical vehicle 510. In general, telemetry system 596 transmits limited kinematics information of viewer 590 as detected by sensors 598. For example, the limited kinematics information may include a position (e.g., GPS position) of viewer 590. As viewer 590 is likely associated with limited motion, other types of kinematics information related to motion may not need to be captured by sensors 598, according to some embodiments. In some embodiments, like sensors 516, sensors 598 may include cameras for capturing a position of a point of view of viewer 590. In some embodiments, display 594 can be implemented in one or more devices worn by viewer 590. For example, display 594 may be implemented in a headset (e.g., a helmet) or a visor worn by viewer 590. In some embodiments, viewer 590 may wear or operate a device that implements simulation component 599. Similar to the functionality of simulation component 522, simulation component 599 may process some of the computations performed by simulation system 540.

In some embodiments, simulation system 540 communicates with content-delivery system 570 to display the competition between live and simulated participants, e.g., physical vehicles and virtual vehicles, to an audience via viewing devices 560. For example, the virtual vehicle may be overlaid onto a real video footage from the perspective of a video camera 580 at the physical racecourse, and the combined video footage may be shown on one or more viewing devices 560 such that the audience which would see the physical vehicle and virtual vehicle on the same racecourse in competition.

In some embodiments, content-delivery system 570 includes: video server 572 for broadcasting video content via a cable or television network; and web server 574 for transmitting video content on-demand or via live streaming via network 502, e.g., the Internet. As discussed above, video server 572 can broadcast video content obtained via video camera 580. In some embodiments, a plurality of video cameras may be present at the physical racecourse to record live video footage of the race from different points of views. In these embodiments, video server 572 can select live video footage captured by one video camera (e.g., video camera 580) from the plurality of video cameras. In some embodiments, each video camera comprises its own point of view, and each point of view is used to determine the visible portion of the virtual vehicle for combining with the live image feed from each video camera.

Though video server 572 and web server 574 are shown as being implemented by content-delivery system 570, one or more of these servers (e.g., video server 572 and web server 574) may be implemented by separate entities or by simulation system 540.

In some embodiments, viewing devices 560 include a variety of electronic devices with displays for presenting video data. For example, audiences attending a live event/competition may watch the competition on viewing devices 560 that include television (TV) screens, jumbotrons, or the like. In another example, audiences at home may operate viewing devices 560 such as TVs, laptops, tablets, smartphones, desktop computers, among other types of mobile devices. Further, in some embodiments, audiences both at home and at the live competition may wear viewing devices 560 such as HMDs or goggles that would display the combined scene (e.g., including live and virtual participants) from the perspective of the audience member based on location-based information of where the audience member is located, as well as head and eye spatial and directional measurements to accurately recreate the scene using processors built into the HMDs, on portable computers or mobile devices with the audience, or from remote servers with camera and audience member positional locations registered in them and which stream the display information to the audience member's HMD or portable computer/mobile device.

In some embodiments, simulated entity 530 includes a simulation device 532 coupled to a display 534 and an input controller 536 for controlling the virtual vehicle in a virtual race. In some embodiments, simulation device 532 includes force controller 538 and display system 539. Simulation device 532 may be a general-purpose computer or a special-purpose computer such as a videogame console.

In some embodiments, input controller 536 may include a keyboard, a videogame controller, a joystick, a steering wheel and pedals, a force pad, a treadmill, a steering wheel, among other types of input devices for controlling the virtual vehicle in a virtual race.

In some embodiments, simulation device 532 receives inputs from the input controller 536 and transmits the received inputs to simulation system 540. In some embodiments, simulation system 540 simulates the virtual vehicle on the virtual racecourse based on the inputs. Then, simulation system 540 may transmit display information corresponding to a position of the virtual vehicle on the virtual racecourse. Display system 539 within simulation device 532 may receive the display information and render the virtual race as computer-generated imagery (CGI) on display 534. In some embodiments, display system 539 projects the virtual race on display 534.

As shown in system 500, display 534 may include a television screen, a monitor, a projector, or other devices for displaying graphics data. In some embodiments, as described with respect to displays of FIG. 1, display 534 may include a head-mounted display (HMD) worn by a user of input controller 536. For example, the HMD may be include a visor, a headset (e.g., a helmet), glasses, goggles, or other devices worn in front of the user's eyes.

In other embodiments, the HMD implements retinal projection techniques to simulate one or more virtual vehicles. For examples, the HMD may include a virtual retinal display (VRD) that projects images onto the left and right eyes of vehicle operator 114 to create a three-dimensional (3D) image of one or more virtual vehicles in the field of view of vehicle operator 114.

In some embodiments, force controller 538 receives force information from simulation system 540. The force information may be associated with an interaction, e.g., a collision, simulated by simulation system 540 between the virtual vehicle and the physical vehicle on the virtual racecourse. To enhance the virtual racing experience for simulated entity, force controller 538 may provide feedback to input controller 536 by, for example, by vibrating input controller 536. In some embodiments, a user operating input controller 536 may wear a haptic suit including one or more actuators controlled by force controller 538 to emulate the physical sensations that would be felt by the user in a real collision.

FIG. 6 is a flowchart illustrating a method 600 for displaying virtual vehicles on displays, according to some embodiments. In some embodiments, method 600 includes steps performed at a physical vehicle 602, a simulation system 604, and a viewer 606. For example, steps performed at physical vehicle 602 may be implemented by components within a physical vehicle such as physical vehicle 101 of FIG. 1 or physical vehicle 510 of FIG. 5. For example, steps performed at simulation system 604 may be implemented by simulation system 140 of FIG. 1 or simulation system 540 of FIG. 5. For example, steps performed at viewer 606 may be performed by devices (e.g., components shown in viewer 590 of FIG. 5) worn by an audience member watching a race between physical vehicle 602 and a virtual vehicle on a physical racecourse.

In step 610, physical vehicle 602 identifies a position of physical vehicle 602. In some embodiments, physical vehicle 602 can identify the position of physical vehicle 602 by detecting kinematics information of physical vehicle 602 via one or more sensors (e.g., sensors 108 of FIG. 1 or sensors 516 of FIG. 5) on board physical vehicle 602. In some embodiments, the position of physical vehicle 602 includes location information for each of two portions of physical vehicle 602. For example, the location information for a first portion of physical vehicle 602 may be detected by a GPS sensor placed at the first portion. In some embodiments, the position of physical vehicle 602 includes a location of one portion of physical vehicle 602 and an orientation of physical vehicle 602. In some embodiments, the orientation of physical vehicle 602 can include gyroscope data detected by a sensor (e.g., a gyroscope) on-board physical vehicle 602.

In step 611, physical vehicle 602 provides the position of physical vehicle 602 to simulation system 604.

In step 620, simulation system 604 receives inputs controlling a virtual vehicle. In some embodiments, the inputs can be received from input controller 536 as described with respect to FIG. 5.

In step 621, simulation system 604 calculates a virtual world for simulating a race on a virtual racecourse between the virtual vehicle and the physical vehicle based on inputs from physical vehicle 602 and inputs controlling the virtual vehicle. In some embodiments, the virtual world can be implemented in a racing simulation (e.g., racing simulation 141 of FIG. 1 or racing simulation 550 of FIG. 5). In some embodiments, the inputs from physical vehicle 602 can include the position of physical vehicle 602 provided in step 611. In some embodiments, to generate the racing simulation, simulation system 604 can calculate a representation of the physical vehicle to add to the virtual racecourse in the racing simulation based, in part, on the position provided in step 611. In some embodiments, to generate the racing simulation, simulation system 604 can calculate the virtual vehicle to add to the virtual racecourse in the racing simulation based on the inputs of step 620. In some embodiments, simulation system 604 can use the inputs to update kinematics information associated with the virtual vehicle in the virtual world. In some embodiments, the kinematics information includes one or more vectors of motion, one or more scalars of motion, a position vector, a GPS location, a velocity, an acceleration, an orientation, or a combination thereof of the virtual vehicle. Based on the updated kinematics information, simulation system 604 can update a simulation of the virtual vehicle in the virtual world, according to some embodiments.

In step 612, physical vehicle 602 identifies a position of a point of view of an operator of physical vehicle 602. In some embodiments, the position of the point of view of the operator can be determined with respect to a head of the operator as detected by a sensor (e.g., a camera) in physical vehicle 602. For example, the position of the point of view can include detecting a spatial position of the operator's head. For example, in some embodiments, the position of the operator's point of view can be determined by at least one of the following: tracking head position, identifying a vector from a point on the head to a fixed point on the physical vehicle, identifying a vector from a point on a head gear to a fixed point on the physical vehicle, identifying a vector from a point on the head to a fixed point in a venue, or identifying a vector from a point on a head gear to a fixed point in the venue. In some embodiments, the venue may include the physical racecourse, the stands, or other infrastructure at the physical racecourse.

In some embodiments, the position of the point of view of the operator can be determined with respect to eyes of the operator as detected by a sensor (e.g., a camera) in physical vehicle 602. For example, the position of the point of view can include detecting a spatial position of a user's eyes, a gaze direction of the user's eyes, or a focus point of the user's eyes where the user is the operator. For example, in some embodiments, the position of the operator's point of view can be determined by at least one of the following: measuring a point of gaze of eyes, tracking eye movement, identifying a vector from one or both eyes to a fixed point on the physical vehicle, identifying a vector from a point on eye-wear (e.g., a visor) to a fixed point in a venue, identifying a vector from one or both eyes to a fixed point on the racecourse, or identifying a vector from one or both eyes to a fixed point in the venue. In some embodiments, the venue may include the physical racecourse, the stands, or other infrastructure at the physical racecourse. In some embodiments, the position of the point of view of the operator can be identified by measuring light reflection or refraction from the eyes.

In step 613, physical vehicle 602 provides a position of the point of view of the operator to simulation system 604. In some embodiments, physical vehicle 602 wirelessly transmits the position of the point of view to simulation system 604. In some embodiments, a telemetry system (e.g., telemetry system 104 of FIG. 1) coupled to physical vehicle 602 can perform the transmitting.

In step 622, simulation system 604 calculates a first portion of the virtual vehicle visible from the position of the point of view of the operator. In some embodiments, as will be further described with respect to FIG. 9, simulation system 604 calculates the first portion by determining which portions of the virtual vehicle are unobscured by the representation of the physical vehicle (with respect to a virtual position within the racing simulation generated in step 621). In particular, the simulation system 604 can determine the virtual position to correspond to the position of the point of view provided by physical vehicle 602 as described in step 613. In some embodiments, the simulation system 604 calculates the first portion by determining which portions of the virtual vehicle are unobscured by the representation of physical objects in the racing simulation. In some embodiments, as described above with respect to FIGS. 3A-D, portions of the virtual vehicle within the racing simulation may be obstructed by representations of other physical or virtual vehicles with respect to the virtual position of the point of view of the operator. For example, a representation of a physical object may obscure a portion of the virtual vehicle from a virtual position of the point of view when the representation of the physical object is positioned on a straight line between the virtual position of the point of view and the obscured portion of the representation of the physical object. In some embodiments, the first portion calculated by simulation system 604 can include the unobstructed portion of the virtual vehicle, as described above. In some embodiments, the first portion can exclude the obstructed portions of the virtual vehicle, as described above.

In some embodiments, the first portion of the virtual vehicle can include one or more virtual shadows being generated within the virtual world. In some embodiments, the one or more virtual shadows can include a virtual shadow of the virtual vehicle, a virtual shadow being cast on the virtual vehicle, or both the virtual shadow of the virtual vehicle and the virtual shadow being cast on the virtual vehicle. For example, the virtual shadow being cast on the virtual vehicle may include a virtual shadow of another virtual vehicle, a virtual shadow of a representation of the physical vehicle in the virtual world, or a virtual shadow of other virtual objects being generated in the virtual world.

In some embodiments, the first portion of the virtual vehicle can include a virtual representation as generated by simulation system 604 (e.g., graphics engine 556). In some embodiments, the virtual representation includes a set of graphical elements. In some embodiments, the virtual representation can be generated by simulation system 604 based on a digital 3-D model of the virtual vehicle stored in a database of models (e.g., vehicle models 544).

In step 623, simulation system 604 outputs the first portion calculated in step 622 to physical vehicle 602. In some embodiments, simulation system 604 wirelessly transmits (e.g., via RF circuitry 548 of FIG. 5) the first portion to physical vehicle 602.

In step 614, physical vehicle 602 provides the first portion to a display system (e.g., display system 102 of FIG. 1 or display system 514 of FIG. 5). In some embodiments, the first portion received from simulation system 604 can include kinematics information calculated by simulation system 604. In some embodiments, the first portion received from simulation system 604 can include graphical information. In some embodiments, the telemetry system (e.g., telemetry system 104 of FIG. 1) coupled to physical vehicle 602 can receive information related to the first portion of the virtual vehicle.

In step 615, physical vehicle 602 displays the first portion of the virtual vehicle on a display (e.g., display 512 of FIG. 5) proximate to physical vehicle 602. In some embodiments, the display system (e.g., rendering component 107 of FIG. 1) renders the first portion of the virtual vehicle on the display. In some embodiments, a rendering component (e.g., rendering component 107 of FIG. 1) in the display system translates the first portion of the virtual vehicle into a virtual representation for displaying on the display. In some embodiments, the virtual representation includes a set of graphical elements. In some embodiments, the display system displays a series of representations of the virtual vehicle (each representation including a visible portion of the virtual vehicle output in step 623) over a period of time by repeating one or more steps (e.g., steps 610-615 and 620-623) of method 600 to simulate a trajectory of the virtual vehicle on the racecourse in the field of view of the operator.

In some embodiments, the display system includes a simulation component (e.g., simulation component 106) that generates the virtual representation. In some embodiments, the virtual representation is generated based on a digital 3-D model of the virtual vehicle. In some embodiments, the digital 3-D model is stored in memory of the display system. The digital 3-D model may be received from, for example, the simulation system.

In some embodiments, the display includes one or more windows of physical vehicle 602. In some embodiments, the display can include one or more windows or mirrors of physical vehicle 602 such as any of the following displays as described with respect to FIG. 1: front windshield 120, rear-view mirror 122, rear windshield 124, side windows 126A and 126B, side mirrors 128A and 128B. In some embodiments, the display can be implemented within a visor or a headset (e.g., helmet 116 of FIG. 1) worn by the operator physical vehicle 602.

In some embodiments, simulation system 604 performs steps similar to steps 622 and 623 to enable other viewers such as viewer 606 to view the virtual vehicle from other points of view. In some embodiments, viewer 606 can be an audience member at a live racing event and watching a race between physical vehicle 602 on a physical racecourse and the virtual vehicle not physical present on the physical racecourse.

Although illustrated together in one system, in some embodiments one of the first visible portion and second visible portion are calculated and output without calculating and output the other portion.

In step 630, a display system of viewer 606 receives a selection for a second point of view. In some embodiments, the selection can be a point of view of viewer 606. For example, viewer 606 may be an audience member present at the physical racecourse and observing physical vehicle 602 on the racecourse. In some embodiments, the selection can be a point of view of a video camera present at the physical racecourse and imaging a portion of the racecourse on which physical vehicle 602 is racing. When physical vehicle 602 is traveling on the portion of the racecourse being captured by the video camera, the video camera may image physical vehicle 602 on a video feed. When the physical vehicle is not travelling across the portion of the racecourse being captured by the camera, the camera may still capture the portion of the racecourse. In some embodiments, the selection for the second point of view can default to the point of view of viewer 606 or a video camera.

In step 631, the display system of viewer 606 identifies a position of the second point of view. In some embodiments where the second point of view is the point of view of viewer 606, the position of the second point of view can be determined with respect to the head of viewer 606 as detected by a sensor (e.g., sensors 598) proximate to viewer 606. For example, in some embodiments, the position of the second point of view can be determined by at least one of the following: tracking head position of viewer 600, identifying a vector from a point on the head to a fixed point in a venue, identifying a vector from a point on a head gear to a fixed point in the venue. In some embodiments, the venue may include the physical racecourse, the stands, or other infrastructure at the physical racecourse.

In some embodiments where the second point of view is the point of view of viewer 606, the position of the second point of view can be determined with respect to eyes of viewer 606 as detected by a sensor (e.g., sensors 598) proximate to viewer 606. For example, the position of the second point of view can include detecting a spatial position of a user's eyes, a gaze direction of the user's eyes, or a focus point of the user's eyes where the user is viewer 606. For example, in some embodiments, the position of the second point of view can be determined by at least one of the following: measuring a point of gaze of eyes, tracking eye movement, identifying a vector from a point on eye-wear (e.g., a visor) to a fixed point in a venue, or identifying a vector from one or both eyes to a fixed point in the venue. In some embodiments, the venue may include the physical racecourse, the stands, or other infrastructure at the physical racecourse. In some embodiments, the position of the second point of view can be identified by measuring light reflection or refraction from the eyes of viewer 606.

In step 632, the display system of viewer 606 provides the position of the second point of view to simulation system 604.

In step 624, simulation system 604 calculates a second portion of the virtual vehicle visible from the position of the second point of view. In some embodiments, as will be further described with respect to FIG. 9, simulation system 604 calculates the second portion by determining which portions of the virtual vehicle are unobscured by the representation of the physical vehicle with respect to a virtual position within the racing simulation generated in step 621. In particular, the simulation system 604 can determine the virtual position to correspond to the position of the second point of view provided by the display system of viewer 606 as described in step 632.

In step 625, simulation system 604 outputs the second portion calculated in step 624 to the display system of viewer 606. In some embodiments, simulation system 604 wirelessly transmits (e.g., via RF circuitry 548 of FIG. 5) the second portion to the display system of viewer 606.

In step 633, a wireless interface proximate to viewer 606 provides the second portion to the display system of viewer 606. In some embodiments, the second portion received from simulation system 604 can include kinematics information calculated by simulation system 604. In some embodiments, the first portion received from simulation system 604 can include graphical information. In some embodiments where the display system of viewer 606 includes the wireless interface, the display system of viewer 606 can directly receive the second portion.

In step 634, the display system of viewer 606 the second portion of the virtual vehicle on a display proximate to viewer 606. In some embodiments, the display system of viewer 606 renders the second portion of the virtual vehicle on the display. In some embodiments, the display proximate to viewer 606 can be implemented in a visor or a helmet worn by viewer 606.

In some embodiments, a non-transitory computer readable storage medium stores one or more programs configured to be executed by one or more processors of an electronic device with a display, the one or more programs including instructions for implementing any of the steps described above with respect to FIG. 6. In some embodiments, a non-transitory computer-readable storage medium comprises computer-readable instructions, which when executed by one or more processors, causes the one or more processors to perform steps described above with respect to FIG. 6. In some embodiments, a system comprises at least one of foregoing non-transitory computer readable storage mediums, and one or more processors configured to execute the instructions of the non-transitory computer readable storage medium(s). In some embodiments, a device comprises one or more processors configured to perform any of the steps described above with respect to FIG. 6.

Figure 7:
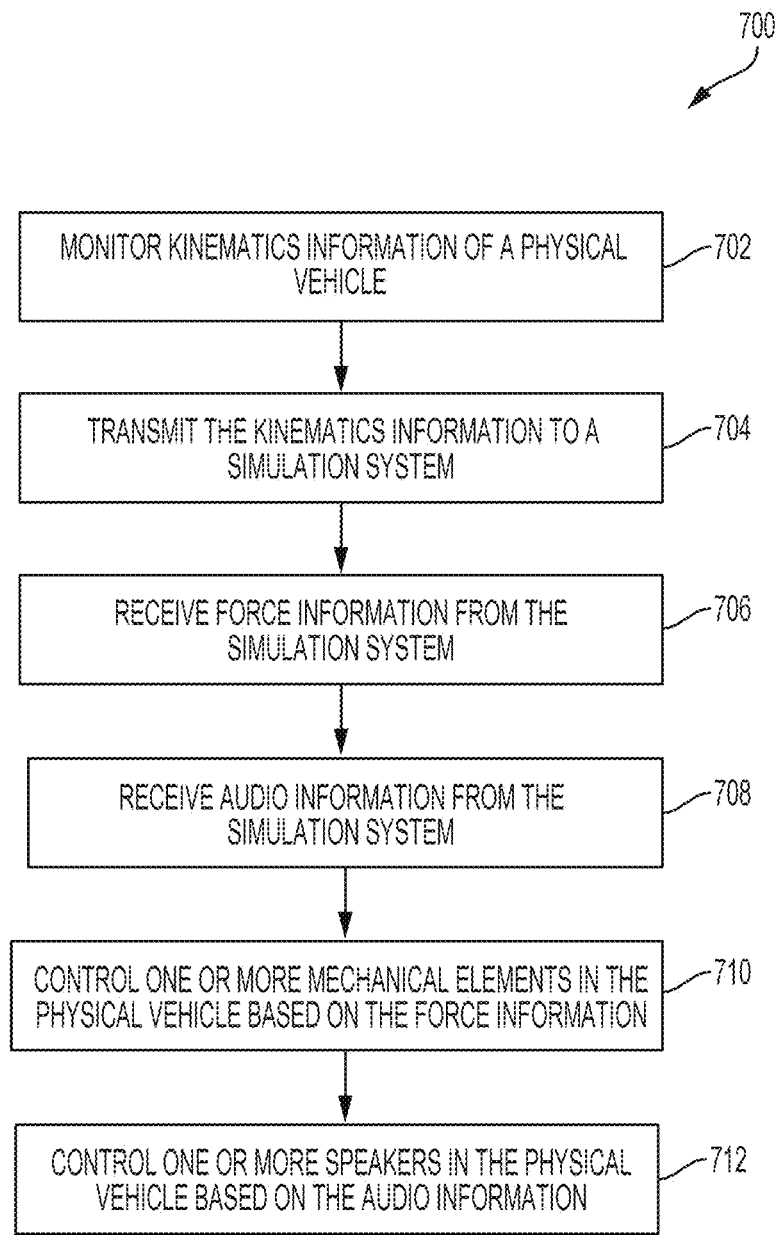
FIG. 7 is a flowchart illustrating a method for providing two-way interactions between a virtual vehicle and a physical vehicle to an operator of the physical vehicle, according to some embodiments.

FIG. 7 is a flowchart illustrating a method 700 for providing two-way interactions between a virtual vehicle and a physical vehicle to an operator of the physical vehicle, according to some embodiments. Method 700 may, for example, be implemented by components within a physical vehicle such as physical vehicle 101 of FIG. 1. In some embodiments, method 700 enhances method 600 to provide tactile and audio feedback in addition to the visual feedback displayed and described with respect to method 600.

In step 702, a telemetry system (e.g., telemetry system 104) monitors kinematics information of the physical vehicle (e.g., physical vehicle 101). In some embodiments the telemetry system includes one or more sensors to detect the kinematics information. For example, the one or more sensors may include a GPS receiver, an accelerometer, a speedometer, an orientation sensor, a gyroscope, among other types of sensors.

In step 704, the telemetry system transmits the kinematics information to a simulation system (e.g., simulation system 140). In some embodiments, the kinematics information is transmitted via RF circuitry (e.g., RF circuitry 105).

In some embodiments, the simulation system simulates a virtual race between the virtual vehicle and the physical vehicle in a virtual world based on the telemetered kinematics information. In some embodiments, the virtual world includes a virtual racecourse where the virtual vehicle and a representation of the physical vehicle are simulated on the virtual racecourse. In some embodiments, the simulation system calculates a distance between the virtual vehicle and the physical vehicle on the virtual racecourse. Based on the calculated distance, the simulation system determines whether a contact (e.g., a collision) exists between the virtual vehicle and the physical vehicle on the virtual racecourse. Then, the simulation system calculates force information that corresponds to the determined contact.

In some embodiments, the simulation system calculates audio information based on the calculated distance and whether the contact exists. In some embodiments, the audio information includes one or more of the sounds of engines, brakes, tires, explosions, or explosions as well as the volume level of the one or more sounds. For example, the simulation system may calculate the volume of the one or more sounds to be inversely proportional to the calculated distance between the virtual vehicle and the physical vehicle on the virtual racecourse.

In step 706, a force controller (e.g., force controller 112) receives force information from the simulation system. For example, a display system (e.g., display system 102) may receive and forward the force information to the force controller. In some embodiments, some or all of the functionality of calculating the force information may be performed at the physical vehicle in a simulation component (e.g., simulation component 106). In these embodiments, the simulation component receives kinematics information of the virtual vehicle or other virtual objects, as will be described with respect to step 816 of FIG. 8. Then, the simulation component may perform the force calculations to generate the force information.

In step 708, the display component receives audio information from the simulation system. In some embodiments, some or all of the functionality of calculating the audio information may be performed at the physical vehicle in the simulation component. In these embodiments, the simulation component receives kinematics information of the virtual vehicle or other virtual objects, as will be described with respect to step 816 of FIG. 8. Then, the simulation component may perform the audio calculations to generate the audio information.

In step 710, the force controller controls one or more mechanical elements implemented in the physical vehicle based on the received force information. In some embodiments, the force controller transmits instructions to one or more force actuators (i.e., examples of mechanical elements) to emulate the physical sensations that would be felt by the operator of the physical vehicle should there be real physical contact between the physical vehicle and another vehicle, displayed as a virtual representation of the virtual vehicle. In some embodiments, the one or more force actuators may be implemented within a seat and head brace (e.g., seat and head brace 130) or within a haptic suit (e.g., haptic suit 118) worn by the operator.

In some embodiments, the mechanical elements may include parts that affect the functionality of the physical vehicle. For example, the mechanical elements may include a steering wheel column, brakes, airbags, etc. Based on the received force information, the force controller may, for example, lock the brakes, deploy the airbags, vibrate the steering wheel column, create a bumping force on a section of the vehicle, slow the car by reducing power, or control other mechanical and/or electrical elements within the physical vehicle.

In step 712, the display system can control one or more speakers of the physical vehicle (e.g., speakers 132) to output the audio information. In some embodiments, the display system can control one or more speakers within a helmet worn by the operator (e.g., helmet 116) to output the audio information.

In some embodiments, a non-transitory computer readable storage medium stores one or more programs configured to be executed by one or more processors of an electronic device with a display, the one or more programs including instructions for implementing any of the steps described above with respect to FIG. 7. In some embodiments, a non-transitory computer-readable storage medium comprises computer-readable instructions, which when executed by one or more processors, causes the one or more processors to perform steps described above with respect to FIG. 7. In some embodiments, a system comprises at least one of foregoing non-transitory computer readable storage mediums, and one or more processors configured to execute the instructions of the non-transitory computer readable storage medium(s). In some embodiments, a device comprises one or more processors configured to perform any of the steps described above with respect to FIG. 7.

Figure 8:
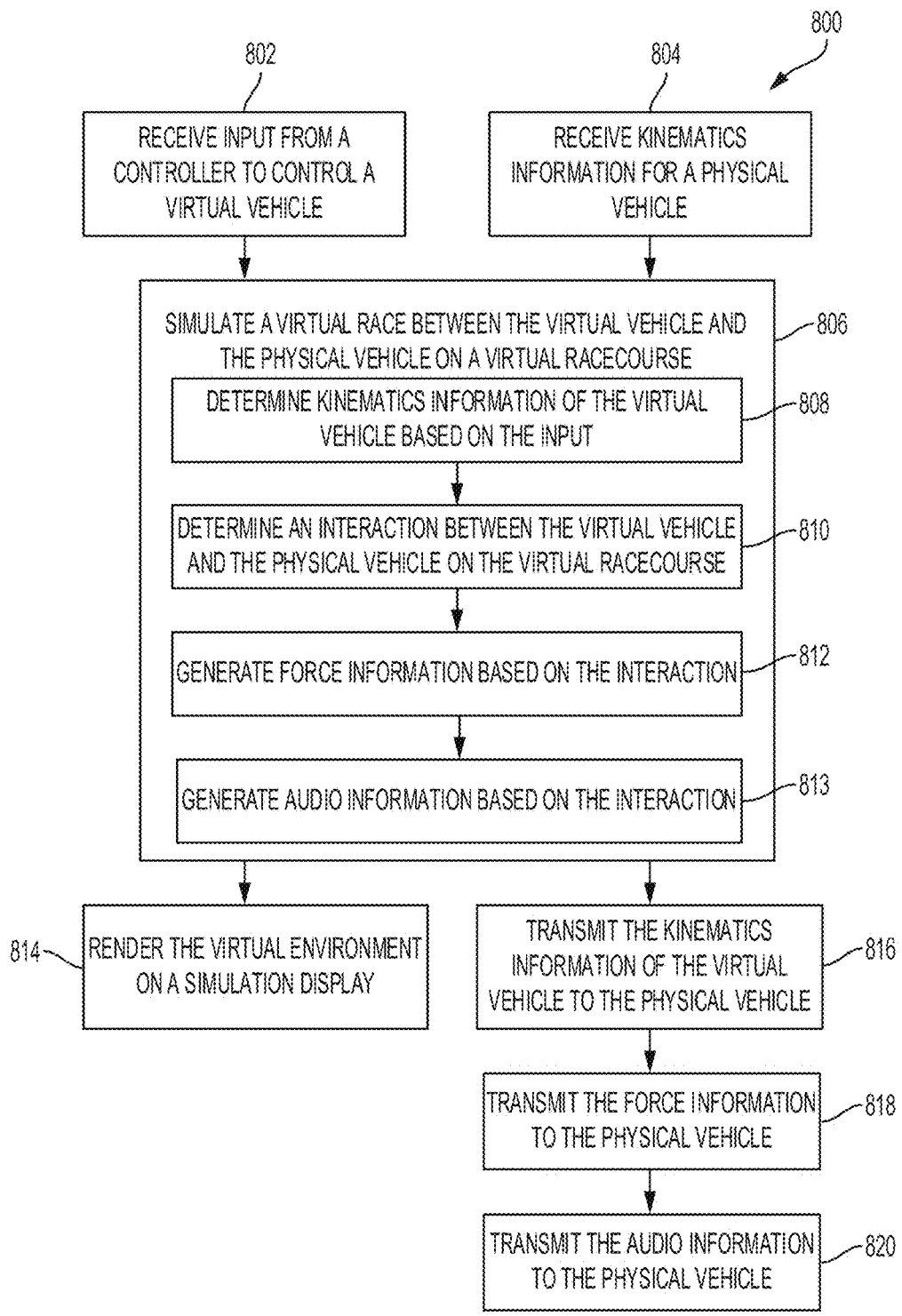
FIG. 8 is a flowchart illustrating a method for simulating a race between a virtual vehicle and a physical vehicle to provide two-way interactions, according to some embodiments.

FIG. 8 is a flowchart illustrating a method 800 for simulating a race between a virtual vehicle and a physical vehicle to provide two-way interactions, according to some embodiments. Method 800 may, for example, be implemented by a simulation system such as simulation system 140 described with respect to FIG. 1 or simulation system 540 described with respect to FIG. 5. As described with respect to FIGS. 1 and 5, the simulation system simulates a virtual race between the virtual vehicle and the physical vehicle on a virtual racecourse in a virtual world where the virtual racecourse is simulated to correspond to a physical racecourse.

In step 802, the simulation system receives input from a controller (e.g., input controller 536) to control a virtual vehicle on the virtual racecourse. In some embodiments, the controller may be a keyboard, a mouse, a video game controller, a joystick, a steering wheel and pedals, a gesture on a touch screen, or a combination thereof among other types of input devices.

In step 804, the simulation system receives kinematics information for the physical vehicle (e.g., physical vehicle 101 of FIG. 1). In some embodiments, the kinematics information is received from the physical vehicle as described with respect to FIG. 1.

In step 806, the simulation system simulates the virtual race between the virtual vehicle and the physical vehicle on the virtual racecourse. In some embodiments, the simulation system simulates the virtual race according to one or more of steps 808-812. In step 808, the simulation system determines kinematics information of the virtual vehicle based on the input received in step 802. For example, the input may include an amount of force applied to a videogame controller that is translated by the simulation system into an acceleration amount. In step 810, the simulation system determines an interaction between the virtual vehicle and the physical vehicle on the virtual racecourse by comparing the kinematics information between the virtual vehicle and the physical vehicle. In some embodiments, the simulation system determines a distance between the virtual vehicle and the physical vehicle simulated on the virtual racecourse to determine whether a contact (e.g., a collision) occurs. In step 812, the simulation system generates force information based on the interaction determined in step 810. In step 813, the simulation system generates audio information based on the interaction determined in step 810.

In step 816, the simulation system transmits the kinematics information of the virtual vehicle to the physical vehicle. In some embodiments, the physical vehicle uses the kinematics information of the virtual vehicle to generate and display the virtual vehicle on a display of the physical vehicle.

In step 818, the simulation system transmits the force information to the physical vehicle as described with respect to step 706 of FIG. 7. In some embodiments, the physical vehicle controls one or more mechanical or electrical elements of the physical vehicle based on the force information to emulate the physical sensations that would be felt by an operator of the physical vehicle in a real collision.

In step 820, the simulation system transmits generated audio information to the physical vehicle as described with respect to step 708 of FIG. 7. In some embodiments, the physical vehicle controls one or more speakers of the physical vehicle based on the audio information to emulate the auditory experience that would be felt by the operator of the physical vehicle should the virtual vehicle be physically present on the physical racecourse. For example, the one or more speakers may include vehicle speakers or speakers implemented within a headset worn by the operator.

In step 814, the simulation system renders the virtual race on a simulation display (e.g., display 534 of FIG. 5).

In some embodiments, a non-transitory computer readable storage medium stores one or more programs configured to be executed by one or more processors of an electronic device, the one or more programs including instructions for implementing any of the steps described above with respect to FIG. 8. In some embodiments, a non-transitory computer-readable storage medium comprises computer-readable instructions, which when executed by one or more processors, causes the one or more processors to perform steps described above with respect to FIG. 8. In some embodiments, a system comprises at least one of foregoing non-transitory computer readable storage mediums, and one or more processors configured to execute the instructions of the non-transitory computer readable storage medium(s). In some embodiments, a device comprises one or more processors configured to perform any of the steps described above with respect to FIG. 8.

FIG. 9 is a flowchart illustrating a method 900 performed by a simulation system to enable display of virtual vehicles, according to some embodiments. Method 900 may, for example, be implemented by simulation system 140 described with respect to FIG. 1 or simulation system 540 described with respect to FIG. 5. In some embodiments, one or more steps of method 900 may correspond to one or more steps performed by simulation system 604 as described with respect to FIG. 6.

In step 902, the simulation system receives inputs controlling a virtual vehicle. For example, the inputs may be received from input controller 536 as described with respect to FIG. 5. In some embodiments, step 902 corresponds to step 620 of FIG. 6.

In step 904, the simulation system receives a position of a physical vehicle. In some embodiments, the position of the physical vehicle can be provided by the physical vehicle, e.g., as described with respect to step 611 of FIG. 6.

In step 906, the simulation system calculates a virtual world for simulating a race on a virtual racecourse between the virtual vehicle and the physical vehicle. In some embodiments, the virtual world can be a racing simulation stored in racing simulation 550 as described in FIG. 5. In some embodiments, step 906 corresponds to step 621 of FIG. 6. In some embodiments, to calculate the virtual world, method 900 performs steps 908-912.

In step 908, the simulation system simulates the virtual vehicle on the virtual racecourse in the virtual world based on the inputs received in step 902. In some embodiments, the inputs control kinematic characteristics that define how the virtual vehicle moves on the virtual racecourse in the virtual world.

In step 910, the simulation system calculates a representation of the physical vehicle in the virtual world based on the position of the physical vehicle received in step 904. In some embodiments, the simulation system can simulate the race between the physical vehicle and the virtual vehicle by adding the representation of the physical vehicle to the virtual world. In some embodiments, to calculate the representation of the physical vehicle, the simulation system transforms physical coordinates associated with the position of the physical vehicle to virtual coordinates within the virtual world.

In step 912, the simulation system calculates a plurality of representations of objects in the virtual world. In some embodiments, a representation of an object (from the plurality of representations) corresponds to a physical object that is present in a physical racecourse being modeled in the virtual world. For example, the virtual racecourse in the virtual world may be simulated based on the physical racecourse, which may include physical objects such as trees, banners, pit stops, etc. In some embodiments, a representation of an object (from the plurality of representations) corresponds to a virtual object that is present on the virtual racecourse being simulated in the virtual world and that is not present on the physical racecourse. For example, the virtual object may include, without limitation, simulated obstacles, smoke, walls, explosions, or debris resulting from a collision between the virtual vehicle and the physical vehicle being simulated in the virtual world.

In some embodiments, the virtual world simulated by the simulation system can include the plurality of calculated representations of physical objects. In some embodiments, the simulation system can calculate the plurality of representations of physical objects by accessing a database of representations.

In step 914, the simulation system receives a position of a point of view at the racecourse. In some embodiments, the position can be received from a physical vehicle as described with respect to step 613 of FIG. 6. In these embodiments, the position represents a position of a point of view of an operator of the physical vehicle. In some embodiments, the position can be received from a viewer as described with respect to step 632 of FIG. 6. In these embodiments, the position represents a position of a point of view selected by the viewer.

In step 916, the simulation system calculates a portion of the virtual vehicle visible from the position of the point of view received in step 914. In some embodiments, step 916 corresponds to steps 622 or 621 as described with respect to FIG. 6 based on a source of the position of the point of view received in step 914. In some embodiments, calculating the portion includes calculating a field of view from the virtual position of the point of view. In these embodiments, the calculated portion can be within the calculated field of view. In some embodiments, to calculate the portion of the virtual vehicle visible from the point of view, method 900 performs steps 918-926.

In step 918, the simulation system calculates a virtual position of the point of view within the virtual world based on the position of the point of view received in step 914. In some embodiments, to calculate the virtual position, the simulation system transforms the physical coordinates of the position of the point of view to virtual coordinates within the virtual world.

In step 920, the simulation system determines whether one or more representations of objects exist between the virtual position and the virtual vehicle in the virtual world. In some embodiments, the one or more representations of physical objects are selected from the plurality of representations of physical objects calculated in step 912. As described above with respect to step 912, the one or more representations of objects can include virtual representations of physical objects that are present on the physical racecourse. In some embodiments, the one or more representations of objects can include virtual objects that are simulated in the virtual world are not present on the physical racecourse. In step 922, if one or more representations of the objects exist, method 900 proceeds to step 926. Otherwise, method 900 proceeds to step 924.

In step 924, the simulation system extracts portions of the virtual vehicle that are unobscured, from the virtual position, by the representation of the physical vehicle in the virtual world.

In step 926, the simulation system extracts portions of the virtual vehicle that are unobscured, from the virtual position, by the representation of the physical vehicle and the one or more representations of objects determined in step 920.

In step 928, the simulation system provides a portion of the virtual vehicle visible from the virtual position of the point of view to include one or more of the extracted portions. In some embodiments, the portion being output includes only the extracted portions. In some embodiments, as discussed above, the simulation system can calculate the field of view from the virtual position of the point of view. In these embodiments, the portion calculated by the simulation system can include: a non-excluded portion representing parts of the portion that are visible within the calculated field of view; and an excluded portion representing parts of the portion that are excluded (i.e., not visible) within the calculated field of view. In some embodiments where the field of view is calculated by the simulation system, the simulation system can calculate the portion to include only the non-excluded portion representing parts of the portion that are visible within the calculated field of view.

In some embodiments, the simulation system provides the portion of the virtual vehicle to the source originating the position of the point of view as described with respect to step 914. For example, step 928 may correspond to steps 623 or 625 as described with respect to FIG. 6 depending on a source of the point of view as described with respect to step 914. In this example, if the position of the point of view is received from the physical vehicle, the simulation system may provide the portion of the virtual vehicle to the physical vehicle as described with respect to step 623 of FIG. 6.

In some embodiments, the virtual world can be a racing simulation stored in racing simulation 550 as described in FIG. 5. In some embodiments, step 906 corresponds to step 621 of FIG. 6. In some embodiments, to calculate the virtual world, method 600 performs steps 908-912.

In some embodiments, a non-transitory computer readable storage medium stores one or more programs configured to be executed by one or more processors of an electronic device, the one or more programs including instructions for implementing any of the steps described above with respect to FIG. 9. In some embodiments, a non-transitory computer-readable storage medium comprises computer-readable instructions, which when executed by one or more processors, causes the one or more processors to perform steps described above with respect to FIG. 9. In some embodiments, a system comprises at least one of foregoing non-transitory computer readable storage mediums, and one or more processors configured to execute the instructions of the non-transitory computer readable storage medium(s). In some embodiments, a device comprises one or more processors configured to perform any of the steps described above with respect to FIG. 9.

Figure 10:
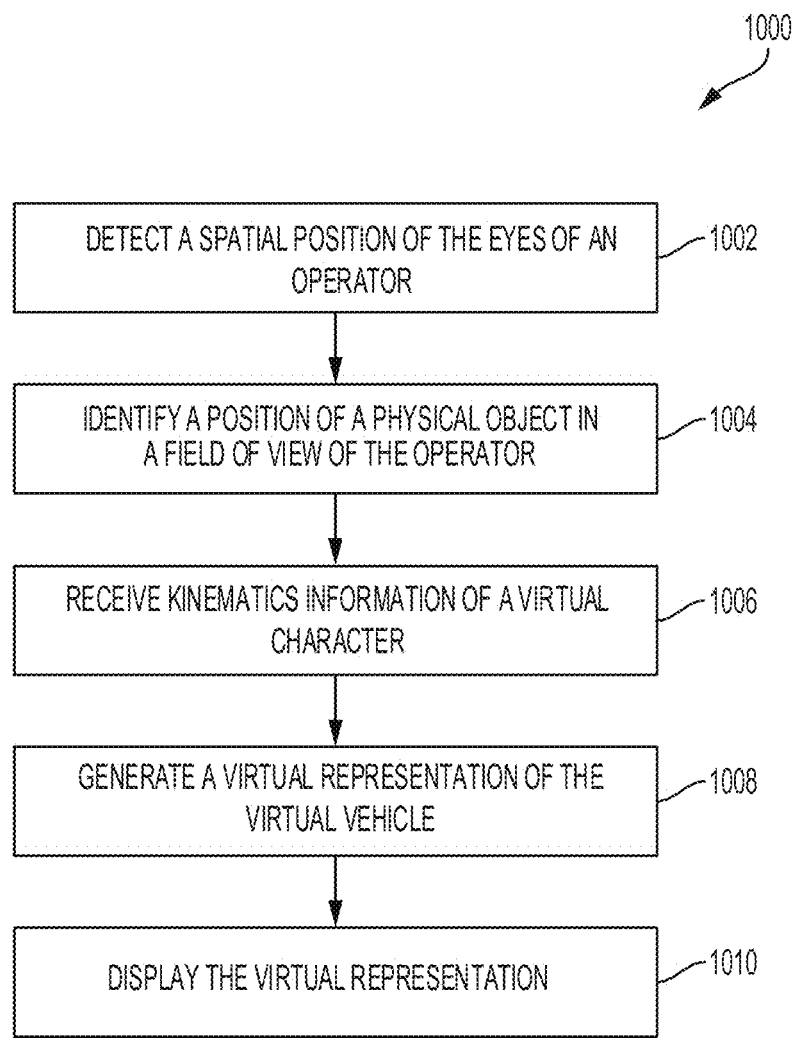
FIG. 10 is a flowchart illustrating a method to enable display of virtual vehicles, according to some embodiments.

FIG. 10 is a flowchart illustrating a method 1000 to enable display of virtual vehicles, according to some embodiments. Method 1000 may, for example, be implemented by components within a physical vehicle such as physical vehicle 101 of FIG. 1 or physical vehicle 510 of FIG. 5. In some embodiments, by simulating the virtual vehicle within a field of view of an operator of the physical vehicle on a racecourse, method 1000 enhances the realism of the interaction between the physical vehicle and the virtual vehicle as experienced by the operator against the virtual vehicle.

In step 1002, a sensor in the physical vehicle (e.g., eye-position detector 110) detects eyes measurements of an operator (e.g., vehicle operator 114) of the physical system (e.g., physical vehicle 101). In some embodiments, the sensor estimates the eyes measurements of the eyes based on detecting the operator's head or a device worn on the head of the operator (e.g., helmet 116, visor over eyes 117, or a head-mounted display (HMD)). For example, the sensor may estimate the eyes measurements of the operator's eyes based on detecting a position and/or an orientation of the device worn on the operator's head.

In step 1004, a display system in the physical vehicle (e.g., rendering component 107) identifies a position (e.g., position 208A from FIG. 2) of a physical object in the field of view of the operator. In some embodiments, the position corresponds to a location on a display (e.g., display 220 from FIG. 2) in proximity to the physical system.

In step 1006, the display system receives kinematics information of the virtual vehicle representing a competitor vehicle not physically on the racecourse. Further, the display system may receive information from a simulation system (e.g., simulation system 140) related to virtual objects within racing simulation 550 or racing simulation 141 that are not physically present on the racecourse. In some embodiments, as described with respect to FIG. 1, the kinematics information may include GPS coordinates, spatial position, orientation, velocity, acceleration, or a combination thereof associated with the virtual vehicle. In some embodiments, the kinematics information can be received from a simulation system (e.g., simulation system 140) that simulates a race between the physical vehicle and the virtual vehicle on a simulated racecourse.

In step 1008, the display system generates a representation of the virtual vehicle based on the position of the physical object identified in step 1004, the eyes measurements detected in step 1002, and the kinematics information received in step 1006. In some embodiment, the display system includes a simulation component (e.g., simulation component 106) that generates the representation. Further, in embodiments where the display system receives information for other virtual objects as described in step 1006, the display system similarly generates graphical, representations for these virtual objects. For example, virtual objects may include a wall, debris from a virtual car, or objects on a virtual racecourse being simulated in racing simulation 550. In some embodiments, the virtual representation is generated based on a digital 3-D model of the virtual vehicle. In some embodiments, the digital 3-D model is stored in memory of the display system. The digital 3-D model may be received from, for example, the simulation system.

In step 1010, the display system (e.g., rendering component 107) displays the representation of the virtual vehicle on the display to align with the physical object represented by the identified position of step 1004. In some embodiments, a rendering component (e.g., rendering component 107 of FIG. 1) in the display system translates the representation into a set of graphical elements for displaying on the display. In some embodiments, the display system displays a series of representations of the virtual vehicle over a period of time by repeating one or more steps (e.g., steps 1002-1010) of method 1000 to simulate a trajectory of the virtual vehicle on the racecourse in the field of view of the operator.

In some embodiments, the representation can be generated remotely by, for example, the simulation system. In these embodiments, the display system receives information related to the representation as generated by the simulation system. Further, the rendering component may translate this received information into a set of graphical elements for displaying on the display.

In some embodiments, a non-transitory computer readable storage medium stores one or more programs configured to be executed by one or more processors of an electronic device with a display, the one or more programs including instructions for implementing any of the steps described above with respect to FIG. 10. In some embodiments, a non-transitory computer-readable storage medium comprises computer-readable instructions, which when executed by one or more processors, causes the one or more processors to perform steps described above with respect to FIG. 10. In some embodiments, a system comprises at least one of foregoing non-transitory computer readable storage mediums, and one or more processors configured to execute the instructions of the non-transitory computer readable storage medium(s). In some embodiments, a device comprises one or more processors configured to perform any of the steps described above with respect to FIG. 10.

Figure 11:
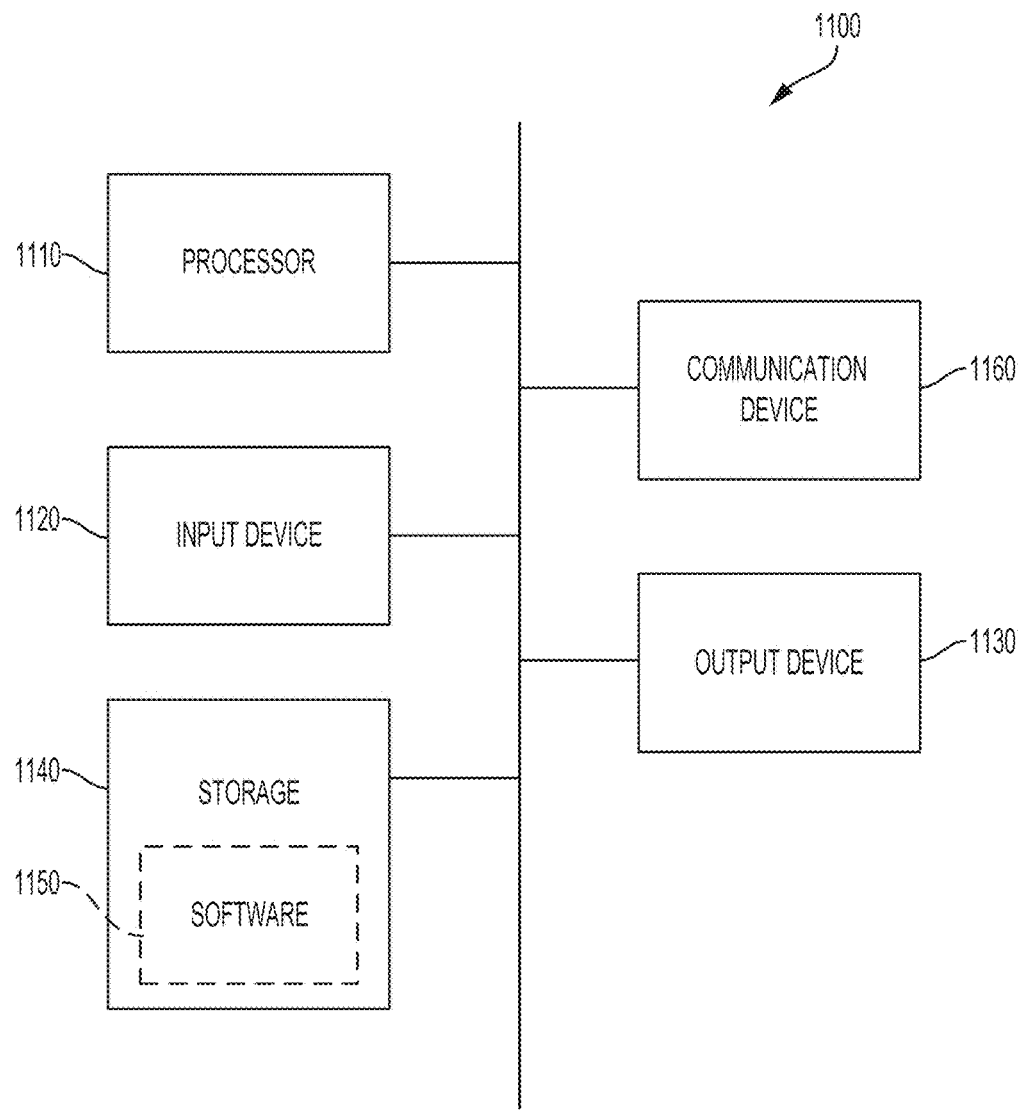
FIG. 11 is a functional block diagram of a computer in accordance with some embodiments.

FIG. 11 illustrates an example of a computer in accordance with one embodiment. Computer 1100 can be a component of a system for simulating virtual vehicles on a display according to the systems and methods described above, such as the devices in physical vehicle 101 or simulation system 140 described with respect to FIG. 1, or can include the entire system itself. In some embodiments, computer 1100 is configured to execute a method for enhancing a virtual race between a physical vehicle and a virtual vehicle, such as each of methods 600, 700, 800, 900, and 1000 of FIGS. 6, 7, 8, 9, and 10, respectively.

Computer 1100 can be a host computer connected to a network. Computer 1100 can be a client computer or a server. As shown in FIG. 11, computer 1100 can be any suitable type of microprocessor-based device, such as a personal computer, workstation, server, videogame console, or handheld computing device, such as a phone or tablet. The computer can include, for example, one or more of processor 1110, input device 1120, output device 1130, storage 1140, and communication device 1160. Input device 1120 and output device 1130 can generally correspond to those described above and can either be connectable or integrated with the computer.

Input device 1120 can be any suitable device that provides input, such as a touch screen or monitor, keyboard, mouse, or voice-recognition device. Output device 1130 can be any suitable device that provides output, such as a touch screen, monitor, printer, disk drive, or speaker.

Storage 1140 can be any suitable device that provides storage, such as an electrical, magnetic, or optical memory, including a RAM, cache, hard drive, CD-ROM drive, tape drive, or removable storage disk. Communication device 1160 can include any suitable device capable of transmitting and receiving signals over a network, such as a network interface chip or card. The components of the computer can be connected in any suitable manner, such as via a physical bus or wirelessly. Storage 1140 can be a non-transitory computer-readable storage medium comprising one or more programs, which, when executed by one or more processors, such as processor 1110, cause the one or more processors to execute methods described herein, such as each of methods 600, 700, 800, 900, and 1000 of FIGS. 6, 7, 8, 9, and 10, respectively.

Software 1150, which can be stored in storage 1140 and executed by processor 1110, can include, for example, the programming that embodies the functionality of the present disclosure (e.g., as embodied in the systems, computers, servers, and/or devices as described above). In some embodiments, software 1150 can be implemented and executed on a combination of servers such as application servers and database servers.

Software 1150, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1100 can implement any operating system suitable for operating on the network. Software 1150 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description sets forth exemplary methods, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. For example, a first virtual vehicle could be termed a second virtual vehicle, and, similarly, a second virtual vehicle could be termed a first touch, without departing from the scope of the various described embodiments.

In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

What is claimed is:

1. A method for displaying a virtual vehicle comprising:
   identifying a position of a physical vehicle at a racecourse;
   identifying a position of a point of view at the racecourse;
   providing the position of the physical vehicle and the position of the point of view at the racecourse to a simulation system;
   calculating, by the simulation system, a virtual world comprising the virtual vehicle and a representation of the physical vehicle at a virtual position;
   calculating, by the simulation system, a virtual position of the point of view within the virtual world based on the position of the point of view at the racecourse;
   calculating, by the simulation system, a portion of the virtual vehicle within the virtual world that is visible from the virtual position of the point of view, wherein the portion of the virtual vehicle visible from the virtual position of the point of view comprises a portion of the virtual vehicle that is unobscured, from the virtual position of the point of view, by the representation of the physical vehicle at the virtual position of the physical vehicle;
   outputting, by the simulation system, the portion of the virtual vehicle visible from the virtual position of the point of view;
   providing, to a display system, the portion of the virtual vehicle visible from the virtual position of the point of view;
   generating, at the display system, a representation of the portion of the virtual vehicle visible from the virtual position of the point of view; and
   displaying a series of representations of the virtual vehicle over a period of time to simulate a trajectory of the virtual vehicle on the racecourse, wherein the series of representations comprises the representation of the portion of the virtual vehicle visible from the virtual position of the point of view.

2. The method of claim 1, wherein identifying the position of the point of view at the racecourse comprises: detecting one or more of a spatial position of a user's eyes, a gaze direction of the user's eyes, or a focus point of the user's eyes.

3. The method of claim 1, wherein the position of the point of view at the racecourse comprises a position of a point of view of an operator of the physical vehicle at the racecourse.

4. The method of claim 1, wherein the position of the point of view at the racecourse comprises a position of a point of view of an audience member present at a racecourse and observing the physical vehicle on the racecourse.

5. The method of claim 1, wherein the position of the point of view at the racecourse comprises a position of a camera present at a racecourse and imaging the physical vehicle on the racecourse.

6. The method of claims 1, wherein calculating the virtual world comprises transforming physical coordinates of the physical vehicle to virtual coordinates in the virtual world and wherein the virtual position of the physical vehicle comprises the virtual coordinates.

7. The method of claim 1, further comprising:
   calculating a representation of a physical object in the virtual world between the virtual position of the point of view and the virtual vehicle within the virtual world, and
   wherein the portion of the virtual vehicle within the virtual world that is visible from the virtual position of the point of view comprises a portion of the virtual vehicle that is unobscured, from the virtual position of the point of view, by a representation of the physical vehicle and the representation of the physical object.

8. The method of claim 1, wherein the portion of the virtual vehicle visible from the virtual position of the point of view consists of portions of the virtual vehicle that are unobscured from the virtual position of the point of view by other representations in the virtual world.

9. The method of claim 1, wherein
   calculating, by the simulation system, the portion of the virtual vehicle within the virtual world that is visible from the virtual position of the point of view comprises calculating a field of view from the virtual position of the point of view and wherein
   providing, to the display system, the portion of the virtual vehicle visible from the virtual position of the point of view comprises providing the portion of the virtual vehicle within the field of view.

10. The method of claim 1, further comprising:
    simulating, by the simulation system, an interaction between the virtual vehicle and the representation of the physical vehicle in the virtual world, wherein the portion of the virtual vehicle visible from the virtual position of the point of view is calculated based on the interaction.

11. A system for displaying virtual vehicles, comprising:
    a first sensor detecting a position of a physical vehicle at a racecourse;
    a second sensor detecting a position of a point of view at the racecourse;
    a simulation system:
      receiving the position of the physical vehicle from the first sensor and the position of the point of view at the racecourse from the second sensor,
      calculating a virtual world comprising the virtual vehicle and a representation of the physical vehicle at a virtual position,
      calculating a virtual position of the point of view within the virtual world based on the position of the point of view at the racecourse,
      calculating a portion of the virtual vehicle within the virtual world that is visible from the virtual position of the point of view, wherein the portion of the virtual vehicle visible from the virtual position of the point of view comprises a portion of the virtual vehicle that is unobscured, from the virtual position of the point of view, by the representation of the physical vehicle at the virtual position of the physical vehicle, and outputting the portion of the virtual vehicle visible from the virtual position of the point of view; and a display system:

receiving, from the simulation system, the portion of the virtual vehicle visible from the virtual position of the point of view, generating a representation of the portion of the virtual vehicle visible from the virtual position of the point of view, and displaying a series of representations of the virtual vehicle over a period of time to simulate a trajectory of the virtual vehicle on the racecourse, wherein the series of representations comprises the representation of the portion of the virtual vehicle visible from the virtual position of the point of view.

12. The system of claim 11, wherein the second sensor detects the position of the point of view at the racecourse by detecting a spatial position of a user's eyes, a gaze direction of the user's eyes, or a focus point of the user's eyes.

13. The system of claim 11, wherein the position of the point of view at the racecourse comprises a position of a point of view of an operator of the physical vehicle at the racecourse.

14. The system of claim 11, wherein the position of the point of view at the racecourse comprises a position of a point of view of an audience member present at a racecourse and observing the physical vehicle on the racecourse.

15. The system of claim 11, wherein the position of the point of view at the racecourse comprises a position of a camera present at a racecourse and imaging the physical vehicle on the racecourse.

16. The system of claim 11, wherein calculating the virtual world comprises transforming physical coordinates of the physical vehicle to coordinates in the virtual world and wherein the virtual position of the physical vehicle comprises the virtual coordinates.

17. The system of claims 11, wherein the simulation system is configured to:

calculate a representation of a physical object in the virtual world between the virtual position of the point of view and the virtual vehicle within the virtual world, and wherein the portion of the virtual vehicle within the virtual world that is visible from the virtual position of the point of view comprises a portion of the virtual vehicle that is unobscured, from the virtual position of the point of view, by a representation of the physical vehicle and the representation of the physical object.

18. The system of claim 11, wherein the portion of the virtual vehicle visible from the virtual position of the point of view consists of portions of the virtual vehicle that are unobscured from the virtual position of the point of view by other representations in the virtual world.

19. The system of claims 11, wherein calculating the portion of the virtual vehicle within the virtual world that is visible from the virtual position of the point of view comprises calculating, by the simulation system, a field of view from the virtual position of the point of view and wherein providing, to the display system, the portion of the virtual vehicle visible from the virtual position of the point of view comprises providing, by the simulation system, the virtual portion of the virtual vehicle within the field of view.

20. The system of claim 11, wherein the simulation system simulates an interaction between the virtual vehicle and the representation of the physical vehicle in the virtual world, and wherein the portion of the virtual vehicle visible from the virtual position of the point of view is calculated based on the interaction.

* * * * *